(12) United States Patent
Duncan et al.

(10) Patent No.: US 9,435,320 B2
(45) Date of Patent: Sep. 6, 2016

(54) MITIGATING WIND TURBINE BLADE NOISE GENERATION IN VIEW OF A MINIMUM POWER GENERATION REQUIREMENT

(71) Applicant: Elwha LLC, Bellevue, WA (US)

(72) Inventors: William David Duncan, Kirkland, WA (US); Roderick A. Hyde, Redmond, WA (US); David B. Tuckerman, Lafayette, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 962 days.

(21) Appl. No.: 13/681,266

(22) Filed: Nov. 19, 2012

(65) Prior Publication Data

US 2014/0140842 A1 May 22, 2014

(51) Int. Cl.
*F03D 7/04* (2006.01)
*F03D 7/02* (2006.01)

(52) U.S. Cl.
CPC .............. *F03D 7/0296* (2013.01); *F03D 7/022* (2013.01); *F03D 7/024* (2013.01); *F05B 2270/333* (2013.01); *Y02E 10/723* (2013.01)

(58) Field of Classification Search
CPC ...... F03D 7/0296; F03D 7/022; F03D 7/024; F05B 2270/333; Y02E 10/723
USPC .................... 416/1, 31, 33, 36, 37, 41, 42
See application file for complete search history.

(56) References Cited

U.S. PATENT DOCUMENTS

| | | | |
|---|---|---|---|
| 4,331,881 A | 5/1982 | Soderholm et al. | |
| 6,320,272 B1 | 11/2001 | Lading et al. | |
| 6,379,115 B1 | 4/2002 | Hirai | |
| 6,688,841 B1 | 2/2004 | Wobben | |
| 7,281,891 B2 | 10/2007 | Smith et al. | |
| 7,330,396 B2 | 2/2008 | Wu | |
| 7,342,323 B2 | 3/2008 | Avagliano et al. | |

(Continued)

FOREIGN PATENT DOCUMENTS

EP   2 258 942 A2   12/2010

OTHER PUBLICATIONS

Ambrose, Stephen et al.; "Wind turbine noise, an independent assessment"; Herald Gazette; located at: knox.villagesoup.com; bearing a date of Sep. 10, 2010; pp. 1-2.

(Continued)

*Primary Examiner* — Christopher Verdier

(57) ABSTRACT

Described embodiments include a wind turbine system. In this embodiment, the system includes a wind turbine including a rotor blade having a controllable feature and attached to a rotor hub drivingly coupled to an electric generator. The controllable feature is configured if activated to decrease a noise generated by the rotor blade and correspondingly to decrease electric power generated by the electric generator. The wind turbine system includes a sensor configured to detect a parameter indicative of present or possible future noise generation state of the rotor blade. The wind turbine system includes a noise manager circuit configured to select a noise mitigation measure responsive to the detected parameter and in compliance with a minimum electric power generation requirement assigned to the wind turbine. The wind turbine system includes a control circuit configured to activate the controllable feature in response to the selected noise mitigation measure.

33 Claims, 17 Drawing Sheets

(56) References Cited

U.S. PATENT DOCUMENTS

| | | |
|---|---|---|
| 7,632,068 B2 | 12/2009 | Bak et al. |
| 7,901,189 B2 | 3/2011 | Gupta et al. |
| 2005/0175451 A1 | 8/2005 | Wobben |
| 2006/0080418 A1 | 4/2006 | Wu |
| 2006/0140760 A1 | 6/2006 | Saddoughi et al. |
| 2006/0140764 A1 | 6/2006 | Smith et al. |
| 2007/0031237 A1 | 2/2007 | Bonnet |
| 2008/0164091 A1 | 7/2008 | Kerber |
| 2008/0317598 A1 | 12/2008 | Barbu et al. |
| 2009/0046289 A1 | 2/2009 | Caldwell et al. |
| 2009/0074574 A1 | 3/2009 | Godsk et al. |
| 2009/0085354 A1 | 4/2009 | Tan et al. |
| 2009/0097976 A1 | 4/2009 | Driver et al. |
| 2009/0169378 A1* | 7/2009 | Menke ............... F03D 7/0224 416/1 |
| 2010/0076614 A1 | 3/2010 | Nies et al. |
| 2010/0140936 A1 | 6/2010 | Benito et al. |
| 2010/0143117 A1* | 6/2010 | Xiong ............... F03D 7/0296 416/1 |
| 2011/0270577 A1 | 11/2011 | Mihok et al. |
| 2012/0027591 A1 | 2/2012 | Kinzie et al. |
| 2013/0164135 A1 | 6/2013 | Himmelmann |

OTHER PUBLICATIONS

Marte, Jack E. et al.; "Technical Report 32-1462: A Review of Aerodynamic Noise from Propellers, Rotors, and Lift Fans"; bearing a date of Jan. 1, 1970; 58 pages; NASA—Jet Propulsion Laboratory, California Institute of Technology; Pasadena, California.

PCT International Search Report; International App. No. PCT/US2013/070520; Feb. 25, 2014; pp. 1-3.

PCT International Search Report; International App. No. PCT/US2013/070525; Mar. 7, 2014; pp. 1-3.

Harris, Michael et al., "Advance measurement of gusts by laser anemometry", Journal of Wind Engineering and Industrial Aerodynamics, 2007, pp. 1637-1647, vol. 95, Elsevier Ltd.

Oerlemans, Stefan et al., "Acoustic Array Measurements on a Full Scale Wind Turbine", 11$^{th}$ AIAA/CEAS Aeroacoustics Conference, May 23-25, 2005, pp. 1-3, Monterey, California.

Oerlemans, S. et al., "Location and quantification of noise sources on a wind turbine", Journal of Sound and Vibration, 2007, pp. 869-883, vol. 299, Elsevier Ltd.

Palmer, William K.G., "A New Explanation for Wind Turbine Whoosh—Wind Shear", Third International Meeting on Wind Turbine Noise, Jun. 17-19, 2009, pp. 1-15, Aalborg, Denmark.

Palmer, William K.G., "Proposed Ministry of the Environment Regulations to Implement the Green Energy and Green Economy Act", 2009, pp. 1-16.

Ramachandran, Rakesh C. et al., "Localization of wind turbine noise sources using a compact microphone array with advanced beamforming algorithms", 4$^{th}$ Berlin Beamforming Conference, 2012, pp. 1-14.

Van Den Berg, G.P., "Effects of the wind profile at night on wind turbine sound", Journal of Sound and Vibration, 2004, pp. 955-970, vol. 277, Elsevier Ltd.

* cited by examiner

Start
↓

710 Detecting an atmospheric variation approaching a rotating rotor blade having a controllable feature and attached to a rotor hub driving an electric generator, the controllable feature configured to decrease a noise generated by the rotor blade if activated.

↓

720 Authorizing a noise mitigation measure responsive to the detected atmospheric variation.

↓

730 Predicting an arrival of the approaching atmospheric variation at the rotating rotor blade.

↓

740 Activating the controllable feature of the rotating rotor blade in response to the authorized noise mitigation measure.

742 Activating the controllable feature of the rotating rotor blade in response to the authorized noise mitigation measure and in response to the predicted arrival of the atmospheric variation.

↓
End

Detecting an atmospheric variation approaching a rotating rotor blade having a controllable feature and attached to a rotor hub driving an electric generator, the controllable feature configured to decrease a noise generated by the rotor blade if activated.

712 Detecting an atmospheric variation approaching a rotating rotor blade using a LIDAR device.

714 Detecting an atmospheric variation approaching a rotating rotor blade using an anemometer sensor.

716 Detecting an atmospheric variation approaching a rotating rotor blade using a radar sensor.

718 Detecting an atmospheric variation approaching the rotor blade within a time frame sufficient to activate the controllable feature before the atmospheric variation affects the rotor blade.

Authorizing a noise mitigation measure responsive to the detected atmospheric variation.

> 722 Authorizing a noise mitigation measure responsive to the detected atmospheric variation and not responsive to a possible impact of the authorized noise mitigation measure on electric power generated by the electric generator.

> 724 Authorizing a noise mitigation measure responsive to the detected atmospheric variation and responsive to a possible impact of the authorized noise mitigation measure on electric power generated by the electric generator.

> 726 Authorizing a noise mitigation measure responsive to the detected atmospheric variation and responsive to a minimum electric power generation requirement assigned to the electric generator.

> 728 Authorizing a noise mitigation measure selected from at least two possible noise mitigation measures responsive to the detected atmospheric variation.

FIG. 14

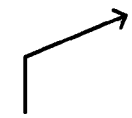

810 Means for detecting an atmospheric variation approaching a rotating rotor blade having a controllable feature and attached to a rotor hub driving an electric generator, the controllable feature configured to decrease a noise generated by the rotor blade if activated.

820 Means for authorizing a noise mitigation measure responsive to the detected atmospheric variation.

830 Means for predicting an arrival of the approaching atmospheric variation at the rotating rotor blade.

840 Means for activating the controllable feature of the rotating rotor blade in response to the authorized noise mitigation measure.

```
         ┌─────────┐
         │  Start  │
         └────┬────┘
              │
              ▼
┌──────────────────────────────────────────────┐
│ Detecting a parameter indicative of present  │  ── 1010
│ or possible future noise generation state    │
│ of a rotating rotor blade having a           │
│ controllable feature and attached to a rotor │
│ hub driving an electric generator, the       │
│ controllable feature configured to decrease  │
│ a noise generated by the rotating rotor      │
│ blade if activated.                          │
└──────────────────┬───────────────────────────┘
                   │
                   ▼
┌──────────────────────────────────────────────┐
│ Selecting a noise mitigation measure         │  ── 1020
│ responsive to the detected parameter and in  │
│ compliance with a minimum electric power     │
│ generation requirement assigned to the       │
│ electric generator.                          │
└──────────────────┬───────────────────────────┘
                   │
                   ▼
┌──────────────────────────────────────────────┐
│ Activating the controllable feature of the   │  ── 1030
│ rotating rotor blade in response to the      │
│ selected noise mitigation measure.           │
└──────────────────┬───────────────────────────┘
                   │
                   ▼
              ┌─────────┐
              │   End   │
              └─────────┘
```

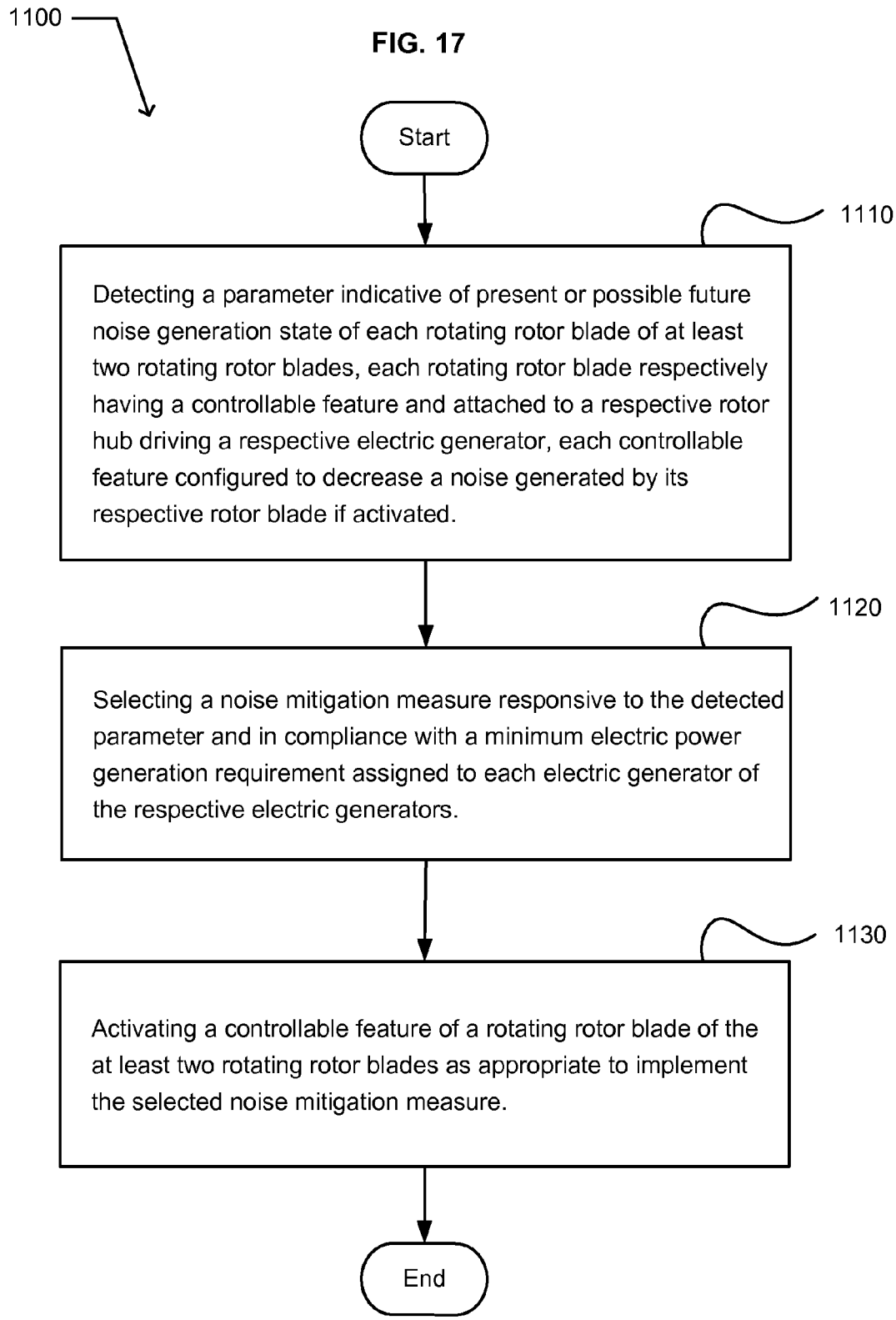

MITIGATING WIND TURBINE BLADE NOISE GENERATION IN VIEW OF A MINIMUM POWER GENERATION REQUIREMENT

CROSS-REFERENCE TO RELATED APPLICATIONS

If an application Data Sheet (ADS) has been filed on the filing date of this application, it is incorporated by reference herein. Any application claimed on the ADS for priority under 35 U.S.C. §§119, 120, 121, or 365(c), and any and all parent, grandparent, great-grandparent, etc. applications of such applications, are also incorporated by reference, including any priority claims made in those application and any material incorporated by reference, including extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 13/681,196, entitled MITIGATING WIND TURBINE BLADE NOISE GENERATION, naming William D. Duncan, Roderick A. Hyde, David B. Tuckerman, and Lowell L. Wood, Jr., as inventors, filed Nov. 19, 2012, is related to the present application.

U.S. patent application Ser. No. 13/681,231, entitled MITIGATING WIND TURBINE BLADE NOISE GENERATION IN RESPONSE TO AN ATMOSPHERIC VARIATION, naming William D. Duncan, Roderick A. Hyde, David B. Tuckerman, and Lowell L. Wood, Jr., as inventors, filed Nov. 19, 2012, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a wind turbine system. In this embodiment, the wind turbine system includes a wind turbine including a rotor blade having a controllable feature and attached to a rotor hub drivingly coupled to an electric generator. The controllable feature is configured if activated to decrease a noise generated by the rotor blade and correspondingly to decrease electric power generated by the electric generator. The wind turbine system includes a sensor configured to detect a parameter indicative of present or possible future noise generation state of the rotor blade. The wind turbine system includes a noise manager circuit configured to select a noise mitigation measure responsive to the detected parameter and in compliance with a minimum electric power generation requirement assigned to the wind turbine. The wind turbine system includes a control circuit configured to activate the controllable feature in response to the selected noise mitigation measure.

For example, and without limitation, an embodiment of the subject matter described herein includes a wind turbine system. In this embodiment, the wind turbine system includes a first wind turbine including a first rotor blade having a first controllable feature and attached to a first rotor hub drivingly coupled to a first electric generator. The first controllable feature configured if activated to decrease a first noise generated by the first rotor blade and correspondingly to decrease a first electric power generated by the first electric generator. The wind turbine system includes a second wind turbine including a second rotor blade having a second controllable feature and attached to a second rotor hub drivingly coupled to a second electric generator. The second controllable feature configured if activated to decrease a second noise generated by the second rotor blade and correspondingly to decrease a second electric power generated by the second electric generator. The wind turbine system includes a sensor configured to detect a parameter indicative of present or possible future noise generation state of the first rotor blade or of the second rotor blade. The wind turbine system includes a noise manager circuit configured to select a noise mitigation measure (i) responsive to the detected parameter and (ii) in compliance with a first minimum electric power generation requirement assigned to the first electric generator or a second minimum power generation requirement assigned to the second electric generator.

The wind turbine system includes a control system configured to activate the first controllable feature or second controllable feature in response to the selected noise mitigation measure.

For example, and without limitation, an embodiment of the subject matter described herein includes a method. In this embodiment, the method includes detecting a parameter indicative of present or possible future noise generation state of a rotating rotor blade having a controllable feature and attached to a rotor hub driving an electric generator. The controllable feature is configured to decrease a noise generated by the rotating rotor blade if activated. The method includes selecting a noise mitigation measure responsive to the detected parameter and in compliance with a minimum electric power generation requirement assigned to the electric generator. The method includes activating the controllable feature of the rotating rotor blade in response to the selected noise mitigation measure.

For example, and without limitation, an embodiment of the subject matter described herein includes a method. In this embodiment, the method includes detecting a parameter indicative of present or possible future noise generation state of each rotating rotor blade of at least two rotating rotor blades. Each rotating rotor blade respectively having a controllable feature and attached to a respective rotor hub driving a respective electric generator, each controllable feature configured to decrease a noise generated by its respective rotating rotor blade if activated. The method includes selecting a noise mitigation measure responsive to the detected parameter and in compliance with a minimum electric power generation requirement assigned to at least one electric generator of the respective electric generators. The method includes activating a controllable feature of a rotating rotor blade of the at least two rotating rotor blades in response to the selected noise mitigation measure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 10 illustrates an example operational flow 700;
FIG. 11 illustrates an alternative embodiment of the operational flow 700 of FIG. 10;
FIG. 12 illustrates an alternative embodiment of the operational flow 700 of FIG. 10;
FIG. 14 illustrates an example system 800;
FIG. 16 illustrates an example operational flow 1000;
and
FIG. 17 illustrates an example operational flow 1100.

DETAILED DESCRIPTION

Figure 1:
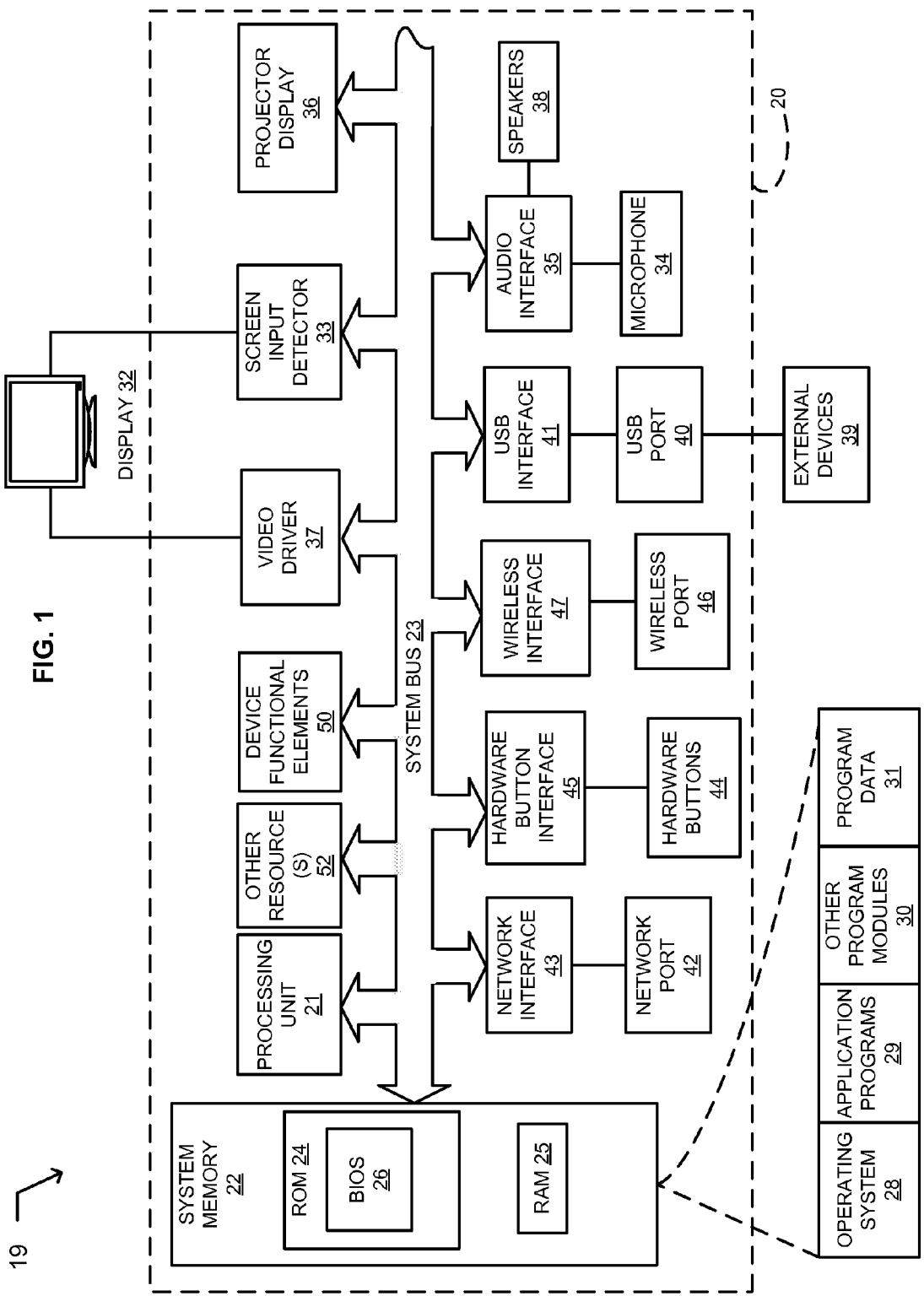
FIG. 1 illustrates an example embodiment of a thin computing device 19.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media holds or transmits a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical, as used herein, is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Figure 2:
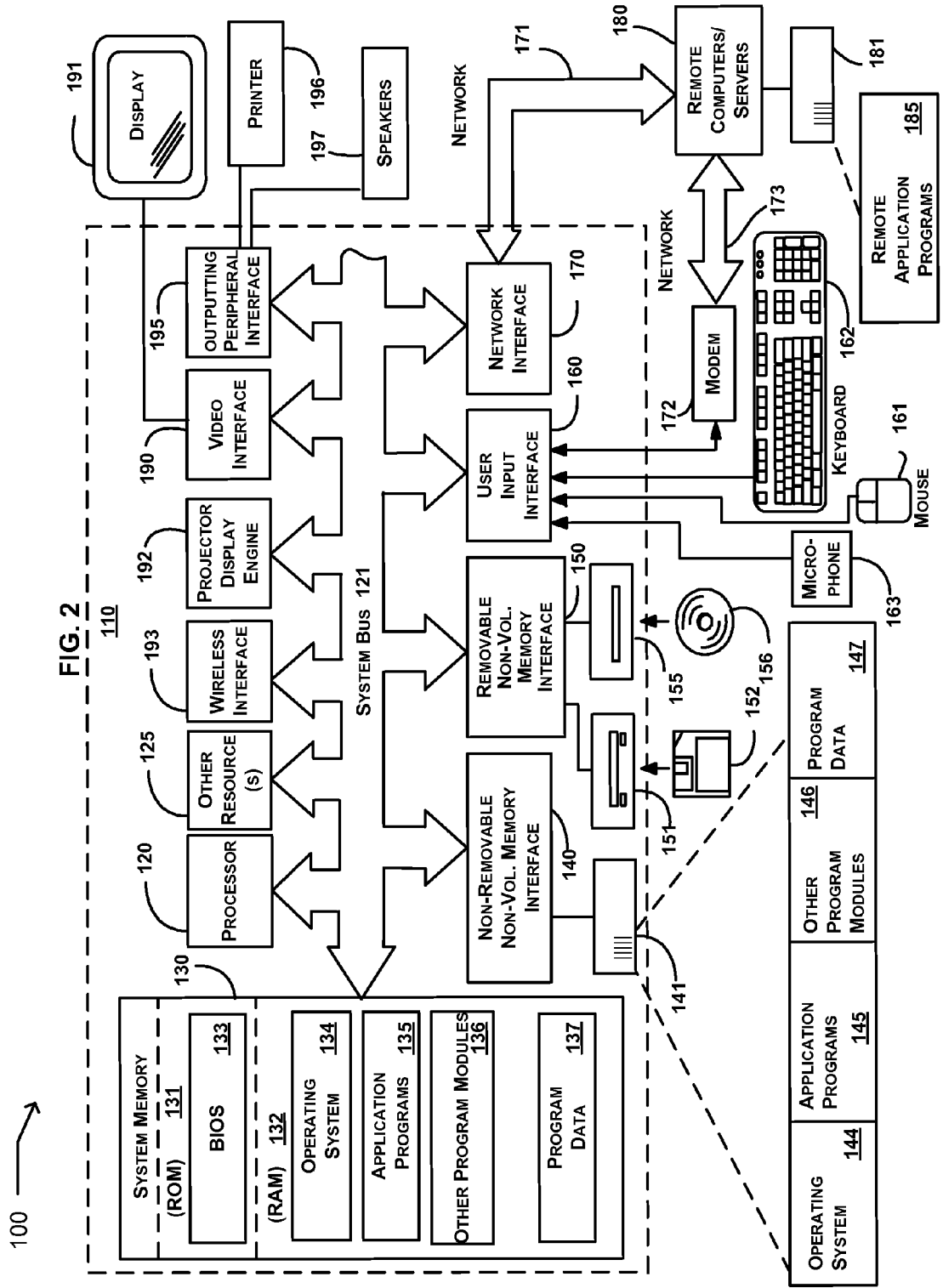
FIG. 2 illustrates an example embodiment of a general-purpose computing system 100.

FIGS. 1 and 2 provide respective general descriptions of several environments in which implementations may be implemented. FIG. 1 is generally directed toward a thin computing environment 19 having a thin computing device 20, and FIG. 2 is generally directed toward a general purpose computing environment 100 having general purpose computing device 110. However, as prices of computer components drop and as capacity and speeds increase, there is not always a bright line between a thin computing device and a general purpose computing device. Further, there is a continuous stream of new ideas and applications for environments benefited by use of computing power. As a result, nothing should be construed to limit disclosed subject matter herein to a specific computing environment unless limited by express language.

FIG. 1 and the following discussion are intended to provide a brief, general description of a thin computing environment 19 in which embodiments may be implemented.

FIG. 1 illustrates an example system that includes a thin computing device 20, which may be included or embedded in an electronic device that also includes a device functional element 50. For example, the electronic device may include any item having electrical or electronic components playing a role in a functionality of the item, such as for example, a refrigerator, a car, a digital image acquisition device, a camera, a cable modem, a printer, an ultrasound device, an x-ray machine, a non-invasive imaging device, or an airplane. For example, the electronic device may include any item that interfaces with or controls a functional element of the item. In another example, the thin computing device may be included in an implantable medical apparatus or device. In a further example, the thin computing device may be operable to communicate with an implantable or implanted medical apparatus. For example, a thin computing device may include a computing device having limited resources or limited processing capability, such as a limited resource computing device, a wireless communication device, a mobile wireless communication device, a smart phone, an electronic pen, a handheld electronic writing device, a scanner, a cell phone, a smart phone (such as an Android® or iPhone® based device), a tablet device (such as an iPad®), or a Blackberry® device. For example, a thin computing device may include a thin client device or a mobile thin client device, such as a smart phone, tablet, notebook, or desktop hardware configured to function in a virtualized environment.

The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 or RAM 25, including an operating system 28, one or more application programs 29, other program modules 30 and program data 31.

A user may enter commands and information into the computing device 20 through one or more input interfaces. An input interface may include a touch-sensitive display, or one or more switches or buttons with suitable input detection circuitry. A touch-sensitive display is illustrated as a display 32 and screen input detector 33. One or more switches or buttons are illustrated as hardware buttons 44 connected to the system via a hardware button interface 45. The output circuitry of the touch-sensitive display 32 is connected to the system bus 23 via a video driver 37. Other input devices may include a microphone 34 connected through a suitable audio interface 35, or a physical hardware keyboard (not shown). Output devices may include the display 32, or a projector display 36.

In addition to the display 32, the computing device 20 may include other peripheral output devices, such as at least one speaker 38. Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are examples and other components and means of establishing communication links may be used.

The computing device 20 may be primarily designed to include a user interface. The user interface may include a character, a key-based, or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and are coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, a camera capturing and saving an image, or communicating with an implantable medical apparatus.

In certain instances, one or more elements of the thin computing device 20 may be deemed not necessary and omitted. In other instances, one or more other elements 52 may be deemed necessary and added to the thin computing device.

FIG. 2 and the following discussion are intended to provide a brief, general description of an environment in which embodiments may be implemented. FIG. 2 illustrates an example embodiment of a general-purpose computing system in which embodiments may be implemented, shown as a computing system environment 100. Components of the computing system environment 100 may include, but are not limited to, a general purpose computing device 110 having a processor 120, a system memory 130, and a system bus 121 that couples various system components including the system memory to the processor 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media. By way of further example, and not of limitation, computer-readable media may include a communication media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

Communication media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media may include wired media, such as a wired network and a direct-wired connection, and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by the processor 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" ® are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, or is coupled to an optical disk drive 155 that reads from and writes to a removable, non-volatile optical disk 156, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies.

A user may enter commands and information into the computing device 110 through input devices such as a microphone 163, keyboard 162, and pointing device 161, commonly referred to as a mouse, trackball, or touch pad. Other input devices (not shown) may include at least one of a touch sensitive display, joystick, game pad, satellite dish, and scanner. These and other input devices are often connected to the processor 120 through a user input interface 160 that is coupled to the system bus, but may be connected by other interface and bus structures, such as a parallel port, game port, or a universal serial bus (USB).

A display 191, such as a monitor or other type of display device or surface may be connected to the system bus 121 via an interface, such as a video interface 190. A projector display engine 192 that includes a projecting element may be coupled to the system bus. In addition to the display, the computing device 110 may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, or to the network 173 through the modem 172, or through the wireless interface 193. The network may include a LAN network environment, or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on memory storage device 181. It will be appreciated that the network connections shown are examples and other means of establishing communication link between the computers may be used.

In certain instances, one or more elements of the computing device 110 may be deemed not necessary and omitted. In other instances, one or more other elements 125 may be deemed necessary and added to the computing device.

Figure 3:
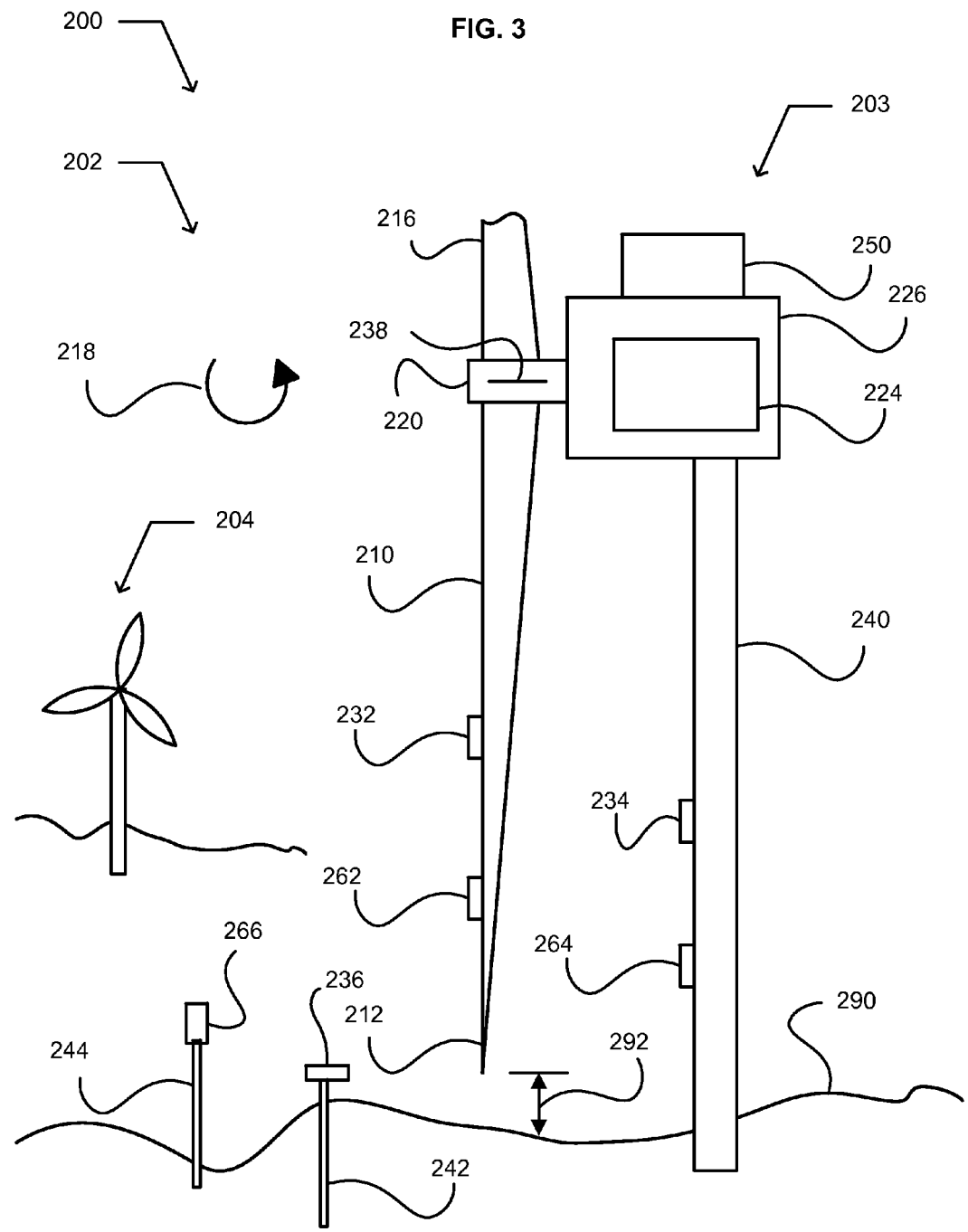
FIG. 3 illustrates an example environment 200.

FIG. 3 illustrates an example environment 200 in which embodiments may be implemented. The illustrated environment includes a wind turbine system 202. The environment may include other wind turbine systems, illustrated by a wind turbine system 204.

Wind turbines larger than one megawatt of rated power may be a surprise for many nearby residents by being much louder than expected. The sounds produced by blades, gearing, and generator may be significantly louder and more noticeable as wind turbine size increases. Long rotor blades create a distinctive aerodynamic sound as air shears off the trailing edge or rear portion of the airfoil and tip. The sound character varies from a "whoosh" at low wind speeds to "a jet plane that never lands" at moderate and higher wind speeds. Blade-induced air vortices spinning off the tip may produce an audible "thump" as each blade sweeps past the mast. Thumping can become more pronounced at distance, sometimes described as "sneakers in a dryer," when sounds from multiple turbines arrive at a listener's position simultaneously.

Wind turbines often are not synchronized and so thumps may arrive together or separately, creating an unpredictable or chaotic acoustic pattern. The sounds of large industrial wind turbines may be clearly audible for miles. They may be considered intrusive sounds that are uncharacteristic of a natural soundscape.

The wind turbine system 202 includes a wind turbine 203 having a rotor blade 210 attached to a rotor hub 220 drivingly coupled to an electric generator 224. For example, the electric generator may be housed in a nacelle 226. The system includes a sensor configured to detect a rotational position 218 of the rotor blade relative to a surface of the ground 290. FIG. 3 illustrates an embodiment where the rotor blade rotates counterclockwise when viewed from a head-on or upwind direction. In another embodiment, the rotor blade may rotate clockwise. In an embodiment, the sensor is illustrated by a sensor 232 carried by the rotor blade 210. In an embodiment, the sensor is illustrated by a sensor 234 carried by a support structure 240. In an embodiment, the sensor is illustrated by a sensor 236 carried by a structure 242 other than the support structure 240. In an embodiment, a rotational position may be expressed as a linear distance measurement 292 of a tip 212 of the rotor blade above the ground. In an embodiment, the sensor is illustrated by a sensor and rotational angle index mark 238 carried on the rotor hub 220.

Figure 5:
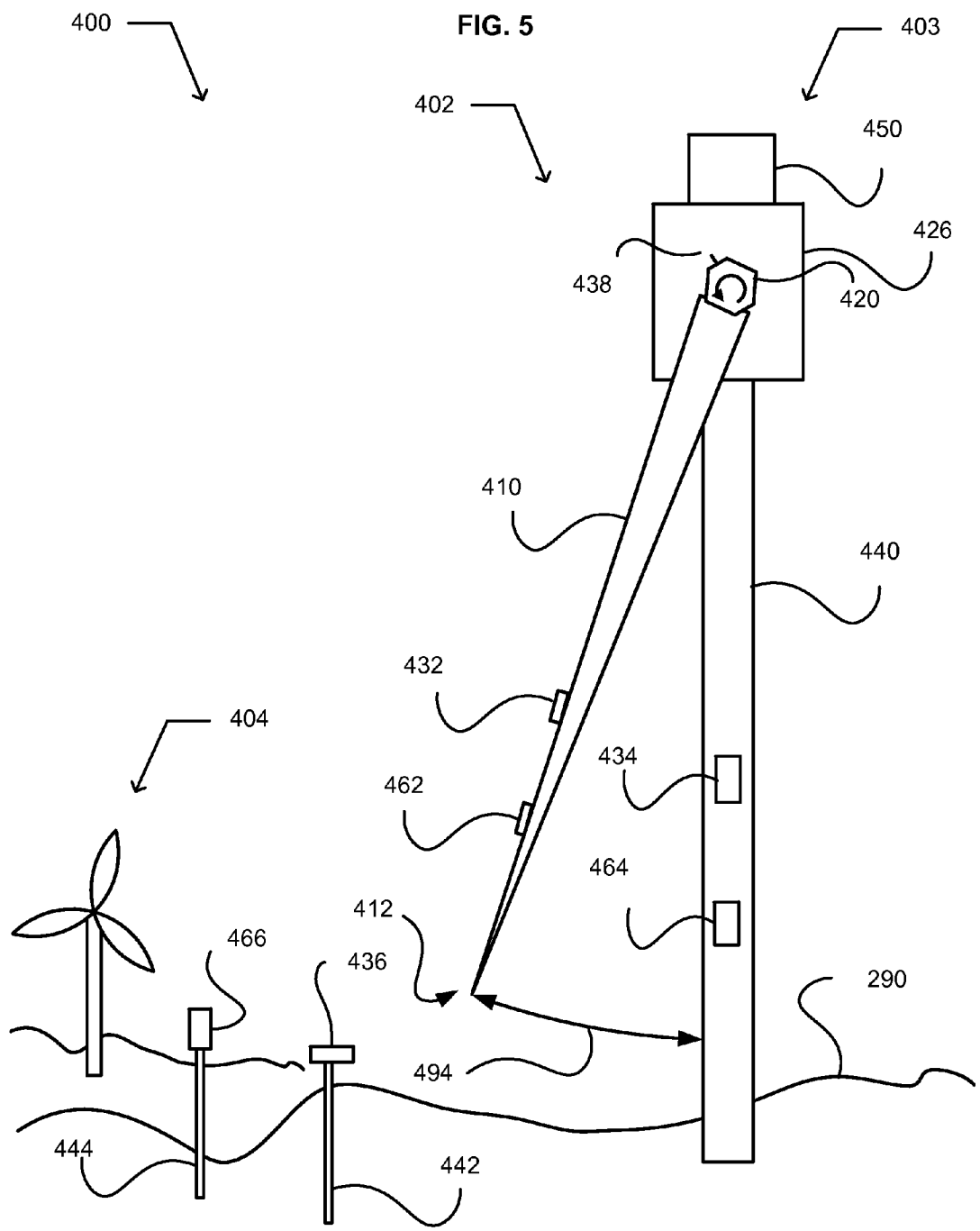
FIG. 5 illustrates an example environment 400.

In an alternative embodiment, the rotational position 218 may be expressed by a degree of rotation relative to horizontal axis or relative to vertical axis of the earth. For example, FIG. 5 illustrates a rotation 494 of a rotor 410 relative to a vertical axis, as illustrated by the support structure 440. Continuing with FIG. 3, the wind turbine system 202 includes a noise controller 250 configured to implement a noise mitigation measure responsive to the detected rotational position 218 of the rotor blade relative to the surface of the ground 290. While the noise controller is illustrated in FIG. 3 as carried by the nacelle 226, the noise controller may be carried, located, or positioned at any convenient location. For example, the noise controller may be carried or mounted within the nacelle, onboard some other portion of the wind turbine, on the support structure 240, or off-board of the wind turbine.

In an embodiment, the surface of the ground 290 includes a naturally occurring surface of the earth, or a surface of an earthen structure, such as a manmade fill or excavation. In an embodiment, the surface of the ground includes a surface of the ground closest to a propeller disc described by a revolution of the rotor blade 210. For example, see the portion of the ground proximate to the tip 212 referenced by the distance measurement 292.

In an embodiment, the sensor is configured to detect a descending motion of the tip 212 of the rotor blade 210 relative to the surface of the ground 290. In an embodiment, the sensor is configured to detect an ascending motion of the tip of the rotor blade relative to the surface of the ground. In an embodiment, the sensor is configured to detect a motion of a tip of the rotor blade generally parallel to the surface of the ground. In an embodiment, the sensor is configured to detect a rotational position 218 of the rotor blade relative to a portion of the surface of the ground proximate to the structure 240 supporting the rotor hub 220. In an embodiment, the sensor is configured to detect a rotational position of the rotor blade relative to the structure supporting the rotor hub. In an embodiment, the sensor is configured to detect a rotor blade angle within the generator. See sensor and rotational angle index mark 238. In an embodiment, the sensor includes a trigger indexed to the rotor blade. In an embodiment, the sensor includes a microphone. In an embodiment, the sensor includes a pressure sensor. In an embodiment, the sensor includes an optical sensor.

In an embodiment, the noise controller 250 is configured to select and implement a noise mitigation measure responsive to the detected rotational position 218 of the rotor blade 210. In an embodiment, the noise mitigation measure includes changing an orientation of at least a portion of the rotor blade. For example, the changing an orientation may include changing a pitch of the entire rotor blade. For example, the changing an orientation may include changing a pitch of a portion of the rotor blade using a controllable feature 262 of the rotor blade. In an embodiment, the noise mitigation measure includes dynamically shaping airflow over at least a portion of a rotor blade. For example, the dynamically shaping airflow may include using the controllable feature of the rotor blade. In an embodiment, the noise mitigation measure includes releasing air from a region on the rotor blade. For example, the releasing air may occur on the vacuum side or the pressure side of the rotor blade using the controllable feature of the rotor blade. In an embodiment, the noise mitigation measure includes creating a transpiration airflow on at least a portion of the rotor blade. Transpiration is a technique in which extra non-physical normal flows are created on an airfoil surface in order to form a new streamline pattern such that the surface streamlines no longer follow the airfoil surface under inviscid flow. For example, the creating a transpiration airflow may include using the controllable feature of the rotor blade.

In an embodiment, the noise mitigation measure is responsive to a detected descending motion of the tip 212 of the rotor blade 210 relative to the surface of the ground 290. In an embodiment, the noise mitigation measure is responsive to a detected ascending motion of a tip of the rotor blade relative to the surface of the ground. In an embodiment, the noise mitigation measure is responsive to a detected rotational position 218 of the rotor blade relative to the surface of the ground. In an embodiment, the noise mitigation measure varies asymmetrically depending upon a detected rotational position 218 of the rotor blade relative to the surface of the ground. For example, the noise mitigation measure may change or vary depending on whether the rotor blade is descending toward the surface of the ground, paralleling the surface of the ground, or ascending away from the surface of the ground. In an embodiment, the noise mitigation measure is implemented by an apparatus carried on at least a portion of the rotor blade, such as by the controllable feature 262 of the rotor blade. In an embodiment, the controllable feature of the rotor blade includes a dynamically shapeable region of the rotor blade located at a first portion of the longitudinal length of the rotor blade, and the noise mitigation measure is implemented by the dynamically shapeable region. An example of a controllable feature of a rotor blade is described by U.S. Pat. App. No. 2009/0097976, Driver et al., Apr. 16, 2009. In an embodiment, the noise mitigation measure is implemented by a speaker. In an embodiment, the speaker is carried by the rotor blade, and may be implemented using the controllable feature 262. In an embodiment, a speaker 264 is carried by the support structure 240 supporting the rotor hub 220. In an embodiment, the speaker 266 is carried by a structure 244 other than the support structure 240.

In an embodiment, the system 202 further includes another rotor blade 216 attached to the rotor hub 220. In an embodiment, the noise mitigation measure is further responsive to a position of the another rotor blade with respect to the surface of the ground 290. In an embodiment, the noise mitigation measure is further responsive to a position of the another rotor blade with respect to the support structure 240. In an embodiment, the system further includes the support structure 240 mounted on or in the ground and maintaining the rotor hub a sufficient distance above the surface of the ground to allow the rotor blade 210 to rotate about the rotor hub without contacting the surface of the ground.

Figure 4:
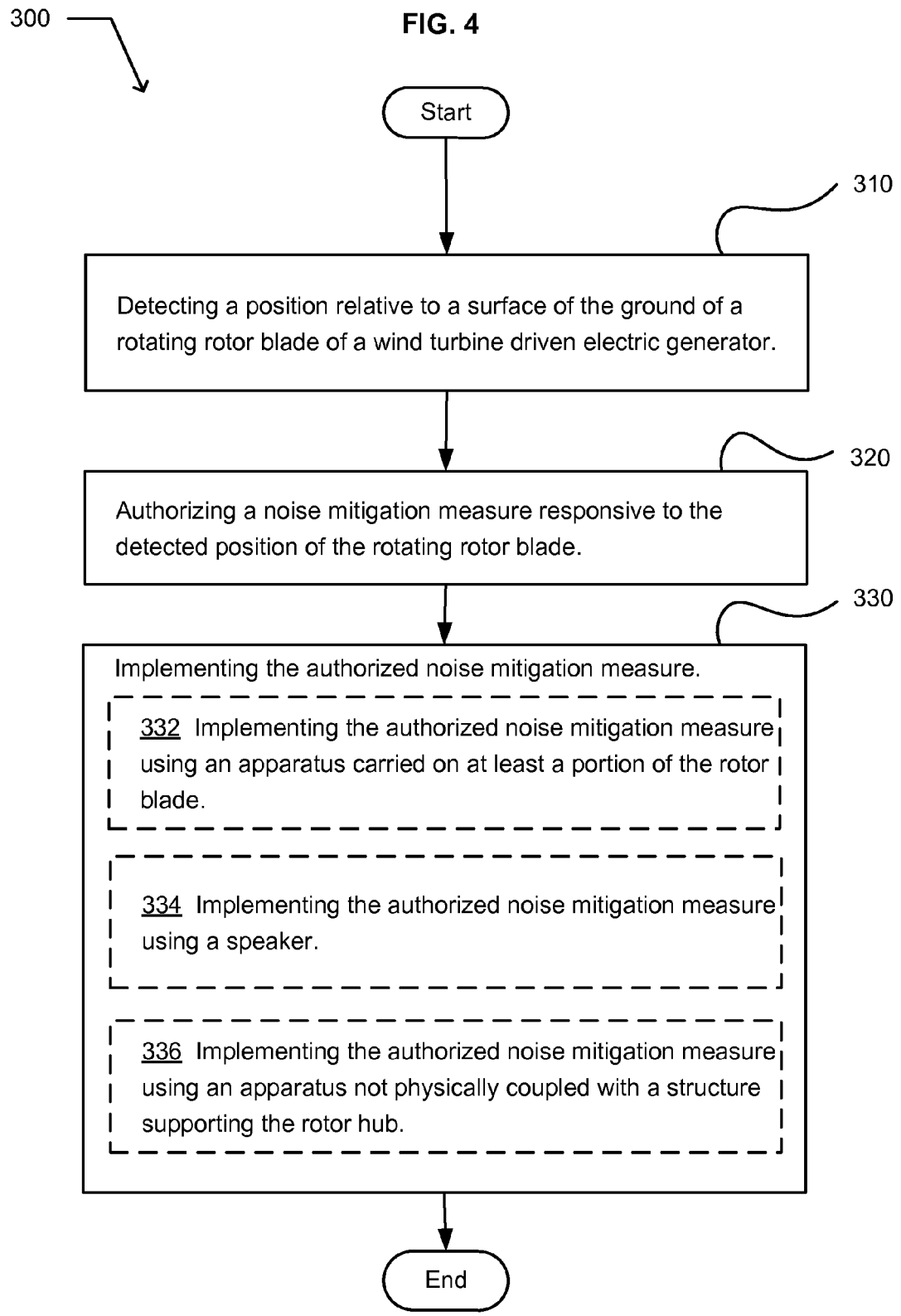
FIG. 4 illustrates an example operational flow 300.

FIG. 4 illustrates an example operational flow 300. After a start operation, the operational flow includes a locating operation 310. The locating operation includes detecting a position relative to a surface of the ground of a rotating rotor blade of a wind turbine driven electric generator. In an embodiment, the locating operation may be implemented using the sensors 232, 234, 236, or 238 described in conjunction with FIG. 3. An approval operation 320 includes authorizing a noise mitigation measure responsive to the detected position of the rotating rotor blade. In an embodiment, the approval operation may be implemented using the noise manager circuit 650 described in conjunction with FIG. 9. An execution operation 330 includes implementing the authorized noise mitigation measure. In an embodiment, the execution operation may be implemented using the noise controller 250 described in conjunction with FIG. 3. The operational flow includes an end operation.

In an embodiment, the detecting a position 310 includes detecting a position of a tip of the rotating rotor blade. In an embodiment, the authorizing 320 includes authorizing a noise mitigation measure responsive to the detected position of the tip of the rotating rotor blade. In an embodiment, the detecting a position includes detecting a position relative to a surface of the ground closest to a propeller disc described by the rotating rotor blade of a rotating rotor blade of a wind turbine driven electric generator. In an embodiment, the detecting a position includes detecting a rotational position of the rotor blade. For example, a detected position may be expressed in a degree of rotation about an axis, such as 10 degrees from vertical, such as in a first descending quadrant, or as 330 degrees from vertical, such as in a third ascending quadrant. In an embodiment, the detecting a position includes detecting a descending or an ascending rotational position of the tip of the rotor blade.

In an embodiment, the authorized noise mitigation measure includes dynamically shaping airflow over at least a portion of the rotor blade. In an embodiment, the authorized noise mitigation measure includes releasing air from a region of the rotor blade. For example, the air may be released from a vacuum side or a pressure side of the rotor blade. In an embodiment, the authorized noise mitigation measure includes creating a transpiration airflow on at least a portion of the rotor blade.

In an embodiment, the implementing 330 includes implementing 332 the authorized noise mitigation measure using an apparatus carried on at least a portion of the rotor blade. In an embodiment, the implementing includes implementing 334 the authorized noise mitigation measure using a speaker. In an embodiment, the speaker is carried by a structure supporting the rotor hub. In an embodiment, the speaker is carried by carried by a structure other than a structure supporting the rotor hub. In an embodiment, the implementing includes implementing 336 the authorized noise mitigation measure using an apparatus not physically coupled with a structure supporting the rotor hub.

FIG. 5 illustrates an example environment 400. The environment includes a wind turbine system 402. In an embodiment, the environment includes another wind turbine system 404. The wind turbine system 402 includes a wind turbine 403 having a rotor blade 410 attached to a rotor hub 420 drivingly coupled to an electric generator. The wind turbine system includes a support structure 440 mounted on or in the ground 290 and maintaining the rotor hub a sufficient distance above the surface of the ground to allow the rotor blade to rotate about the rotor hub without contacting the surface of the ground. The wind turbine system includes a sensor configured to detect a rotational position 494 of the rotor blade relative to the support structure. In an embodiment, the sensor is illustrated by a sensor 432 carried by the rotor blade 410. In an embodiment, the sensor is illustrated by a sensor 434 carried by a support structure 440. In an embodiment, the sensor is illustrated by a sensor 436 carried by a structure 442 other than the support structure 440. In an embodiment, the sensor is illustrated by a sensor and rotational position index mark 438 carried on the rotor hub 420. The wind turbine system includes a noise controller 450 configured to implement a noise mitigation measure responsive to the detected rotational position of the rotor blade relative to the support structure. While the noise controller is illustrated in FIG. 5 as being carried by the nacelle 426, the noise controller may be carried, located, or positioned at any convenient location. For example, the noise controller may be carried or mounted within the nacelle, onboard some other portion of the wind turbine, on the support structure 440, or off board of the wind turbine.

In an embodiment, the sensor is configured to detect a position of a tip 412 of the rotor blade relative 410 to the support structure 440. In an embodiment, the sensor is configured to detect the rotor blade sweeping past the support structure. In an embodiment, the sensor is configured to detect a motion of a tip 412 of the rotor blade generally parallel to the surface of the ground. In an embodiment, the noise controller 450 is further configured to predict when the rotor blade will sweep past the support structure, and to further implement the noise mitigation measure responsive to the predicted sweep of the rotor blade past the support structure. For example, the prediction may include information forecasting or predicting a time until or when the rotor blade will sweep past the support structure. In an embodiment, the noise mitigation measure is implemented by a controllable feature 462 located on the rotor blade. In an embodiment, the noise mitigation measure is implemented by an apparatus located on the support structure, such as the controllable feature 464. For example, the controllable feature may be configured to emit an air blast or pull a vacuum in a region swept through by the rotor blade. In an embodiment, the noise mitigation measure is responsive to the rotor blade sweeping past the support structure. In an embodiment, the noise mitigation measure is implemented by an apparatus carried by a structure other than a structure supporting the rotor hub on the support structure, such as a speaker 466 carried on a structure 444. In an embodiment, the noise mitigation measure is responsive to a detected tip of the rotor blade sweeping past the support structure.

In an embodiment, the noise mitigation measure is response to a detected rotational position 438 of the rotor blade 410 relative to the support structure 440. In addition to being expressed in degrees or quadrants, the rotational position may be expressed as approaching, paralleling, or departing the support structure. In an embodiment, the system 402 further includes another rotor blade attached to the rotor hub 420. In an embodiment, the noise mitigation measure is further responsive to a position of the another rotor blade with respect to the support structure 440.

Figure 6:
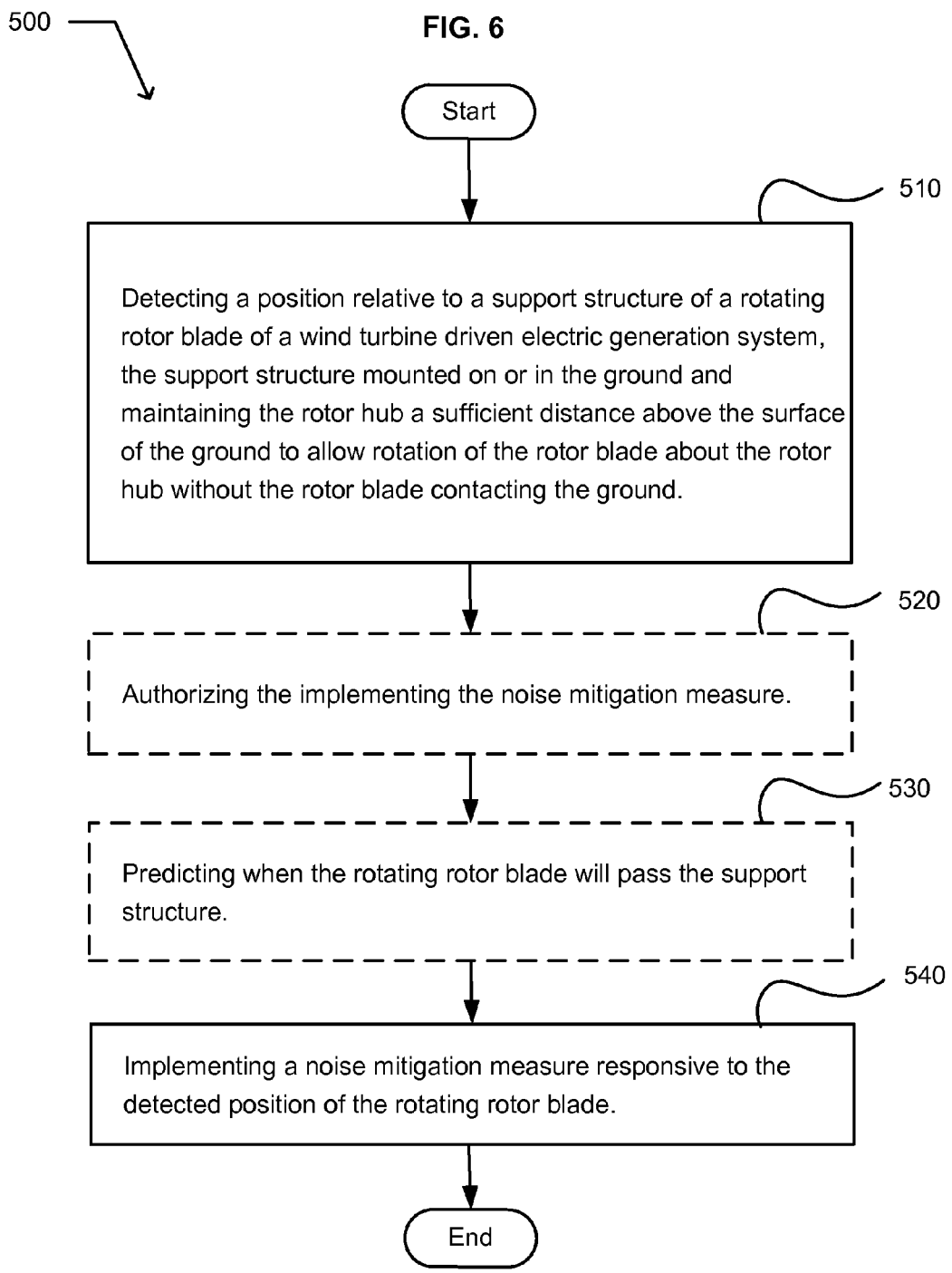
FIG. 6 illustrates an example operational flow 500.

FIG. 6 illustrates an example operational flow 500. After a start operation, the operational flow includes a locating operation 510. The locating operation includes detecting a position relative to a support structure of a rotating rotor blade of a wind turbine driven electric generation system. The support structure is mounted on or in the ground and maintains the rotor hub a sufficient distance above the surface of the ground to allow rotation of the rotor blade about the rotor hub without the rotor blade contacting the ground. In an embodiment, the locating operation may be implemented using at least one of the sensors 432, 434, 436, or 438 described in conjunction with FIG. 5. An execution operation 540 includes implementing a noise mitigation measure responsive to the detected position of the rotating rotor blade. In an embodiment, the execution operation may be implemented using the noise controller 450 described in conjunction with FIG. 5. The operational flow includes an end operation.

In an embodiment, the detecting includes detecting a position relative to a support structure of a tip of a rotating rotor blade of a wind turbine electric generation system. In an embodiment, the detecting includes detecting the rotating rotor blade rotating past the support structure. For example a tip or a particular portion of the rotating rotor blade may be detected.

In an embodiment, the operational flow 500 includes an approval operation 520 authorizing implementing the noise mitigation measure. In an embodiment, the operational flow includes a timing operation 530 predicting when the rotating rotor blade will pass the support structure.

Figure 7:
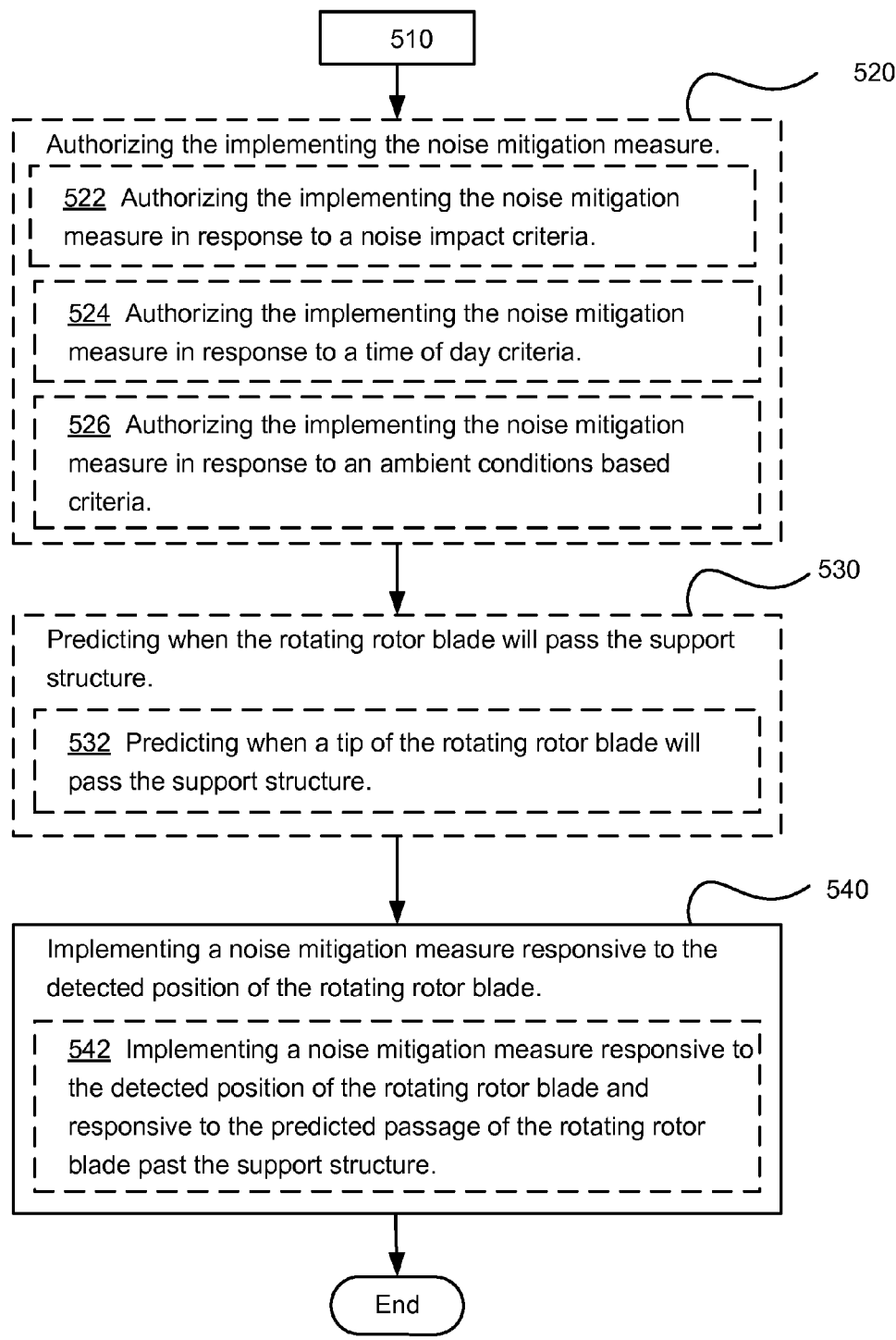
FIG. 7 illustrates an alternative embodiment of the operational flow 500 described in conjunction with FIG. 6.

FIG. 7 illustrates an alternative embodiment of the operational flow 500 described in conjunction with FIG. 6. In an embodiment, the approval operation 520 includes at least one additional operation. The at least one additional operation may include an operation 522, an operation 524, or an operation 526. The operation 522 includes authorizing the implementing the noise mitigation measure in response to a noise impact criteria. The operation 524 includes authorizing the implementing the noise mitigation measure in response to a time of day criteria. The operation 526 includes authorizing the implementing the noise mitigation measure in response to an ambient conditions based criteria. For example, an ambient conditions based criteria may include an ambient condition of the wind turbine, or an ambient condition of a potentially downwind neighborhood. In an embodiment, the timing operation 530 may include at least one additional operation, such as an operation 532. The operation 532 includes predicting when a tip of the rotating rotor blade will pass the support structure. In an alternative embodiment, the timing operation may include predicting when a portion of the rotating rotor blade will pass the support structure. In an embodiment, the execution operation 540 may include at least one additional operation, such as an operation 542. The operation 542 includes implementing a noise mitigation measure responsive to the detected position of the rotating rotor blade and responsive to the predicted passage of the rotating rotor blade past the support structure.

Figure 8:
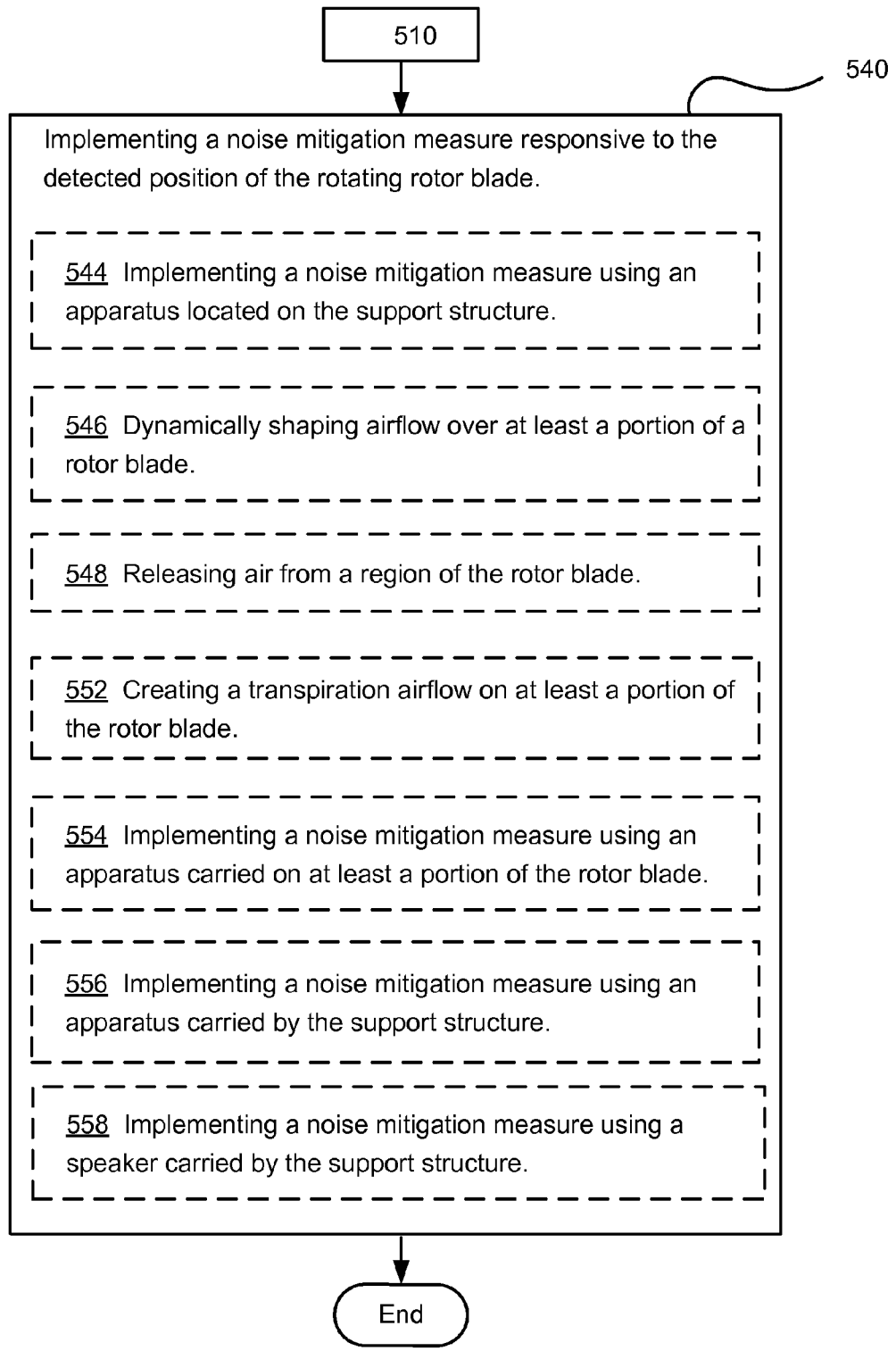
FIG. 8 illustrates an alternative embodiment of the operational flow 500 described in conjunction with FIG. 6.

FIG. 8 illustrates an alternative embodiment of the operational flow 500 described in conjunction with FIG. 6. In an embodiment, the execution operation 540 may include at least one additional operation. The at least one additional operation may include an operation 544, an operation 546, an operation 548, an operation 552, an operation 554, an operation 556, or an operation 558. The operation 544 includes implementing a noise mitigation measure using an apparatus located on the support structure. For example, a noise mitigation measure may include an air blast, or a vacuum in a region swept through by the rotor blade. The operation 546 includes dynamically shaping airflow over at least a portion of a rotor blade. An operation includes dynamically shaping airflow over at least a portion of a rotor blade as the rotor blade rotates past the support structure. An operation includes changing an orientation of at least a portion of the rotating rotor blade. The operation 548 includes releasing air from a region of the rotor blade. For example, the air may be released from the vacuum side or the pressure side of the rotating rotor blade. An operation includes releasing air from a region of the rotor blade as the rotor blade rotates past the support structure. The operation 552 includes creating a transpiration airflow on at least a portion of the rotor blade. An operation includes creating a transpiration airflow on at least a portion of the rotor blade as the rotor blade rotates past the support structure. The operation 554 includes implementing a noise mitigation measure using an apparatus carried on at least a portion of the rotor blade. The operation 556 includes implementing a noise mitigation measure using an apparatus carried by the support structure. The operation 558 includes implementing a noise mitigation measure using a speaker carried by a structure supporting the rotor hub. An operation includes implementing a noise mitigation measure using a speaker carried by a structure other than the structure supporting the rotor hub.

Figure 9:
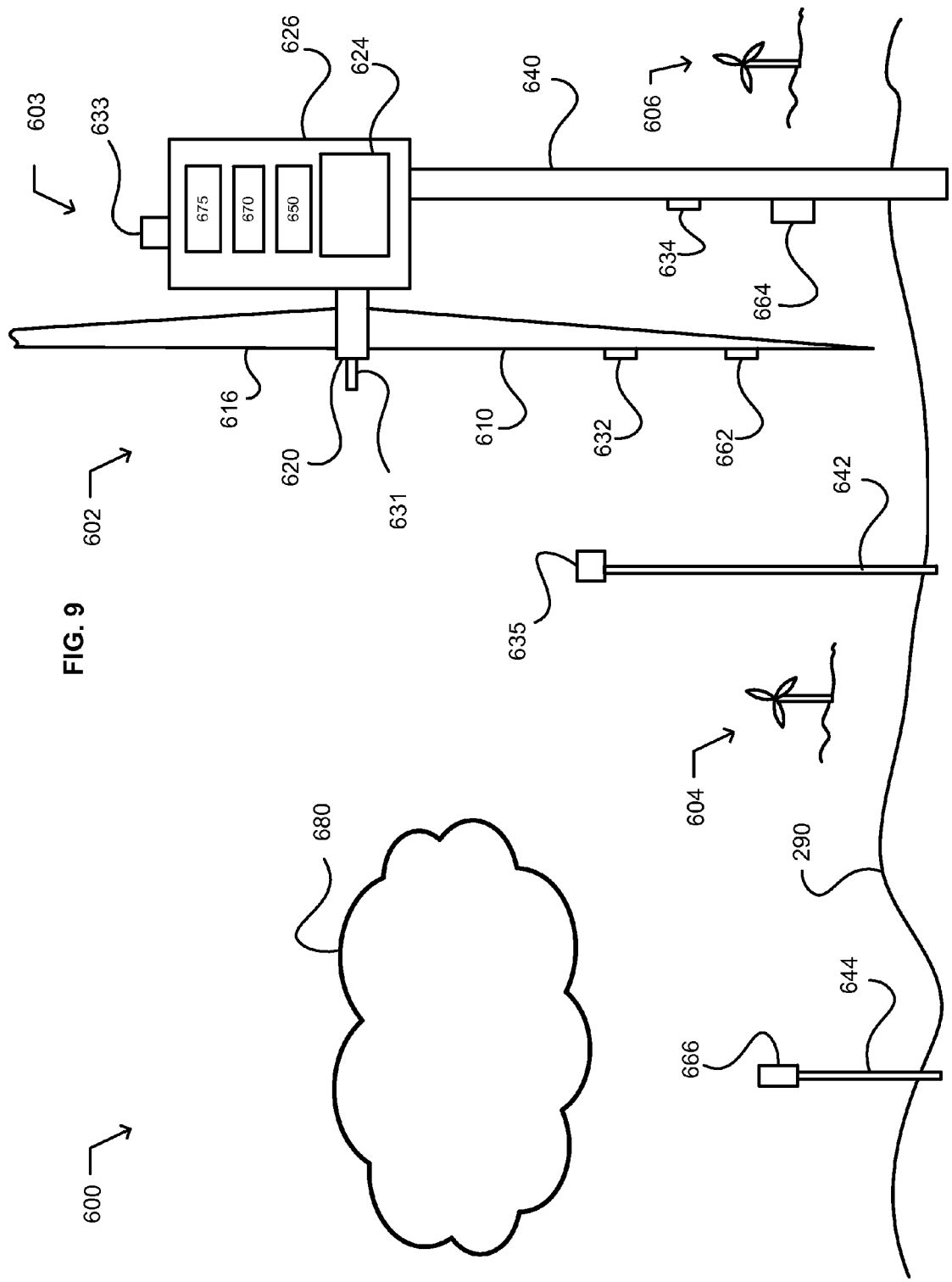
FIG. 9 illustrates an example environment 600.

FIG. 9 illustrates an example environment 600. The environment includes a wind turbine system 602. In an alternative embodiment, the environment includes another wind turbine system 604, and may include a further wind turbine system 606.

The wind turbine system 602 includes a wind turbine 603 having a rotor blade 610 attached to a rotor hub 620 drivingly coupled to an electric generator 624, and an optional second rotor blade 616. The system includes a sensor configured to detect an atmospheric variation 680 approaching the rotor blade 610. Illustrated embodiments of the sensor include a sensor 631 carried by the rotor hub 620, a sensor 632 carried by the rotor blade, a sensor 633 carried by a nacelle 626, a sensor 634 carried by the structure 640 supporting the rotor hub, and a sensor 635 carried by a structure 642 other than the support structure 640. The system includes a controllable feature configured to decrease a noise generated by the rotor blade if activated. Illustrated embodiments of the controllable feature include a controllable feature 662 carried by the rotor blade, a controllable feature 664 carried by the support structure 640, and a controllable feature 666 carried by another structure 644 other than the support structure 640.

The system 602 includes a noise manager circuit 650 configured to authorize a noise mitigation measure responsive to the detected atmospheric variation 680. While the noise manager system is illustrated in FIG. 9 as carried by the nacelle 626, the noise manager system may be carried, located, or positioned at any convenient location. For example, the noise manager system may be carried or mounted within the nacelle 626, onboard some other portion of the wind turbine, on the support structure 640, or offboard the wind turbine. The system includes a control circuit 670 configured to activate the controllable feature in response to the authorized noise mitigation measure. While the control circuit is illustrated in FIG. 9 as carried by the nacelle 626, the control circuit may be carried, located, or positioned at any convenient location. For example, the control circuit may be carried or mounted within the nacelle, onboard some other portion of the wind turbine, on the support structure, or off-board the wind turbine.

In an embodiment, the system 602 includes a computing device 675 configured to predict a possible shift or change in the detected atmospheric variation as it approaches the rotor blade. For example, the computing device may predict that a detected atmospheric pressure drop will increase or decrease by the time it reaches the rotor blade. For example, the computing device may predict that a detected wind speed change will dissipate by the time it reaches the rotor blade.

In an embodiment, the rotor blade 610 includes the controllable feature 662. In an embodiment, the system 602 further includes a support structure carrying the controllable feature. In an embodiment, the support structure 640 carries the controllable feature 662 and supports the rotor hub 620 a sufficient distance above the ground to allow rotation of the rotor blade about the rotor hub without contacting the ground 290. In an embodiment, the support structure includes a structure 644 carrying the controllable feature 666.

In an embodiment, the sensor includes a laser Doppler anemometer (hereafter "LIDAR"). An example of a LIDAR sensor used to measure wind is described by U.S. Pat. App. No. 2009/0046289, Caldwell et al., Feb. 19, 2009. Another example of a LIDAR sensor used to measure wind is described by U.S. Pat. App. No. 2006/0140764, Smith et al., Jun. 29, 2006. In an embodiment, the sensor includes a rotary cup anemometer. In an embodiment, the sensor includes a sonic anemometer. In an embodiment, the sensor includes an atmospheric pressure sensor. In an embodiment, the sensor includes a radar sensor. In an embodiment, the sensor is carried by the rotor hub, a nacelle enclosing the rotor hub, or a structure supporting the rotor hub. In an embodiment, the sensor is configured to detect an atmospheric variation approaching the rotor blade at a distance of at least one rotor blade length upwind of the rotor hub. In an embodiment, the sensor is carried by a structure potentially downwind of the rotor hub. While this embodiment may not be illustrated in FIG. 9, a sensor, for example, may be carried by a structure positioned substantially between the wind turbine system 602 and a neighborhood or noise-alleviation zone. In an embodiment, the sensor is carried by a structure potentially upwind of the rotor hub, illustrated as by the support structure 642 carrying the sensor 637. In an embodiment, the sensor is configured to detect an atmospheric variation 680 approaching the rotor blade within a time frame sufficient for the noise manager circuit 650 to authorize a noise mitigation measure and the controller circuit 670 to implement the noise mitigation measure before or as the atmospheric variation affects the rotor blade. In an embodiment, the sensor includes a sensor configured to detect a spatial variation in airflow approaching the rotor blade. For example, a spatial variation may include a vertical or horizontal variation profile. In an embodiment, the sensor includes a sensor configured to detect a variation in air moisture content, temperature, or density in an airflow approaching the rotor blade. In an embodiment, the detected atmospheric variation includes a detected transient atmospheric variation. For example, a detected atmospheric variation may include a gust, shift in wind direction, or patch of warm or cold air. In an embodiment, the detected atmospheric variation includes a detected wind speed, a change in wind speed, a wind direction, a change in wind direction, or a wind gradient. For example, a detected wind speed variation may include a ½, 1, 2, 3, 5 mph wind speed variation over a particular time, or a directional variation of 2, 5, or 10 degrees over a particular time for example. In an embodiment, the detected atmospheric variation includes a detected turbulence, temperature, or pressure variation. In an embodiment, the detected atmospheric variation includes a detected atmospheric variation categorized as possibly having an affect on generation of the noise by the rotor blade. In an embodiment, the detected atmospheric variation includes a detected variation in a wind speed approaching the rotor blade.

In an embodiment, the controllable feature includes an airflow-modifiable region 662 of the rotor blade 610 located at a portion of a longitudinal length of the rotor blade. In an embodiment, the noise mitigation measure includes changing a cross-sectional shape of the airflow-modifiable region of the rotor blade. In an embodiment, the noise mitigation measure includes controlling airflow over the airflow-modifiable region. In an embodiment, the noise mitigation measure includes dynamically altering airflow over the airflow-modifiable region. In an embodiment, the noise mitigation measure includes releasing air from the airflow-modifiable region. In an embodiment, the noise mitigation measure includes creating a transpiration airflow through the airflow-modifiable region. In an embodiment, the controllable feature includes a controllable rotor blade pitch. In an embodiment, the noise mitigation measure includes changing a pitch of the rotor blade. In an embodiment, the noise mitigation measure is further implemented by a controllable feature 664 carried on the structure 640 supporting the rotor hub.

In an embodiment, the authorization of the noise mitigation measure is not responsive to a possible impact of the authorized noise mitigation measure on electric power generated by the electric generator 624. For example, the authorization may not take into account, or may be indifferent or agnostic to a possible reduction in electricity generated by the electric generator. In an embodiment, the authorization of the noise mitigation measure is responsive to a possible impact of the authorized noise mitigation measure on electric power generated by the electric generator. In an embodiment, the authorization of the noise mitigation measure includes authorizing the noise mitigation measure if the electric power generation reduction is below a threshold level. For example, implementation of the noise mitigation measure may be authorized if the anticipated power generation reduction is less than 10% of that currently being generated. In an embodiment, the authorization of the noise mitigation measure is responsive to a minimum electric power generation requirement for the wind turbine system. For example, implementation of the noise mitigation measure may be authorized if the power generation is predicted or calculated to remain above 1 megawatt. In an embodiment, the noise manager circuit is further configured to select the noise mitigation measure from at least two possible noise mitigation measures responsive to the detected atmospheric variation. In an embodiment, the authorizing includes authorizing a noise mitigation measure selected from at least two possible noise mitigation measures responsive to the detected atmospheric variation.

In an embodiment, the noise manager circuit 650 is further configured to select the noise mitigation measure having the least reduction in electric power generated by the electric generator 624 from at least two possible noise mitigation measures responsive to the detected atmospheric variation 680. In an embodiment, the noise manager circuit is configured to authorize a noise mitigation measure responsive to a detected average wind speed approaching the rotor blade 610 exceeding a threshold wind speed. In an embodiment, the noise manager circuit is configured to authorize a noise mitigation measure responsive to a detected variation of atmospheric pressure approaching the rotor blade that exceeds a threshold criterion. In an embodiment, the noise manager circuit is configured to authorize a noise mitigation measure responsive to a detected turbulence, air moisture content, air temperature, or air density variation approaching the blade.

In an embodiment, the sensor is configured to detect an atmospheric variation 680 approaching the rotor blade 610 within a time frame sufficient for the noise manager circuit 650 to select the noise mitigation measure and for the controller circuit 670 to implement the authorized noise mitigation measure before or as the atmospheric variation affects the rotor blade. In an embodiment, the system 602 further includes the support structure 640 positioning the rotor hub 620 a sufficient distance above the ground 290 to allow rotation of the rotor blade about the rotor hub 620 without contacting the ground.

FIG. 10 illustrates an example operational flow 700. After a start operation, the operational flow includes a locating operation 710. The locating operation includes detecting an atmospheric variation approaching a rotating rotor blade having a controllable feature and attached to a rotor hub driving an electric generator. The controllable feature is configured to decrease a noise generated by the rotor blade if activated. In an embodiment, the locating operation may be implemented using a sensor of the sensors 631-637 described in conjunction with FIG. 9. An approval operation 720 includes authorizing a noise mitigation measure responsive to the detected atmospheric variation. In an embodiment, the approval operation may be implemented using the noise manager circuit 650 described in conjunction with FIG. 9. An execution operation 740 includes activating the controllable feature of the rotating rotor blade in response to the authorized noise mitigation measure. In an embodiment, the execution operation may be implemented using the control circuit 670 described in conjunction with FIG. 9. The operational flow includes an end operation.

In an alternative embodiment, the operational flow 700 includes predicting 730 an arrival of the approaching atmospheric variation at the rotating rotor blade. In an alternative embodiment, the execution operation 740 includes activating 742 the controllable feature of the rotating rotor blade in response to the authorized noise mitigation measure and in response to the predicted arrival of the atmospheric variation. In an embodiment, the operational flow includes computationally predicting a possible shift or change in the detected atmospheric variation as it approaches the rotor blade. In an embodiment, the computationally predicting may be implemented using the computing device 675 described in conjunction with FIG. 9.

FIG. 11 illustrates an alternative embodiment of the operational flow 700 of FIG. 10. In an embodiment, the locating operation 710 may include at least one additional embodiment. The at least one additional embodiment may include an operation 712, an operation 714, an operation 716, or an operation 718. The operation 712 includes detecting an atmospheric variation approaching a rotating rotor blade using a LIDAR device. The operation 714 includes detecting an atmospheric variation approaching a rotating rotor blade using an anemometer sensor. The operation 716 includes detecting an atmospheric variation approaching a rotating rotor blade using a radar sensor. The operation 718 includes detecting an atmospheric variation approaching the rotor blade within a time frame sufficient to activate the controllable feature before or as the atmospheric variation affects the rotor blade.

FIG. 12 illustrates an alternative embodiment of the operational flow 700 of FIG. 10. In an embodiment, the approval operation 720 may include at least one additional operation. The at least one additional operation may include an operation 722, an operation 724, an operation 726, or an operation 728. The operation 722 includes authorizing a noise mitigation measure responsive to the detected atmospheric variation and not responsive to a possible impact of the authorized noise mitigation measure on electric power generated by the electric generator. The operation 724 includes authorizing a noise mitigation measure responsive to the detected atmospheric variation and responsive to a possible impact of the authorized noise mitigation measure on electric power generated by the electric generator. The operation 726 includes authorizing a noise mitigation measure responsive to the detected atmospheric variation and responsive to a minimum electric power generation requirement assigned to the electric generator. The operation 728 includes authorizing a noise mitigation measure selected from at least two possible noise mitigation measures responsive to the detected atmospheric variation.

Figure 13:
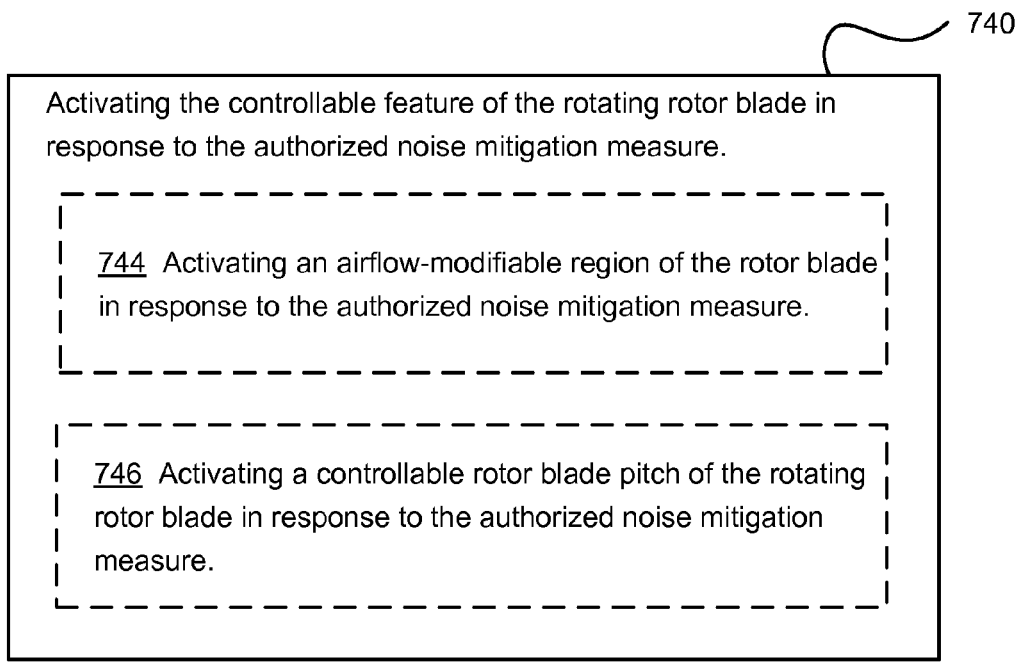
FIG. 13 illustrates an alternative embodiment of the operational flow 700 of FIG. 10.

FIG. 13 illustrates an alternative embodiment of the operational flow 700 of FIG. 10. In an embodiment, the execution operation 740 may include at least one additional operation. The at least one additional operation may include an operation 744 or an operation 746. The operation 744 includes activating an airflow-modifiable region of the rotor blade in response to the authorized noise mitigation measure. The operation 746 includes activating a controllable rotor blade pitch of the rotating rotor blade in response to the authorized noise mitigation measure.

FIG. 14 illustrates an example system 800. The system includes means 810 for detecting an atmospheric variation approaching a rotating rotor blade having a controllable feature and attached to a rotor hub driving an electric generator. The controllable feature is configured to decrease a noise generated by the rotor blade if activated. The system includes means 820 for authorizing a noise mitigation measure responsive to the detected atmospheric variation. The system includes means 840 for activating the controllable feature of the rotating rotor blade in response to the authorized noise mitigation measure.

In an alternative embodiment, the system 800 includes means 830 for predicting an arrival of the approaching atmospheric variation at the rotating rotor blade.

Figure 15:
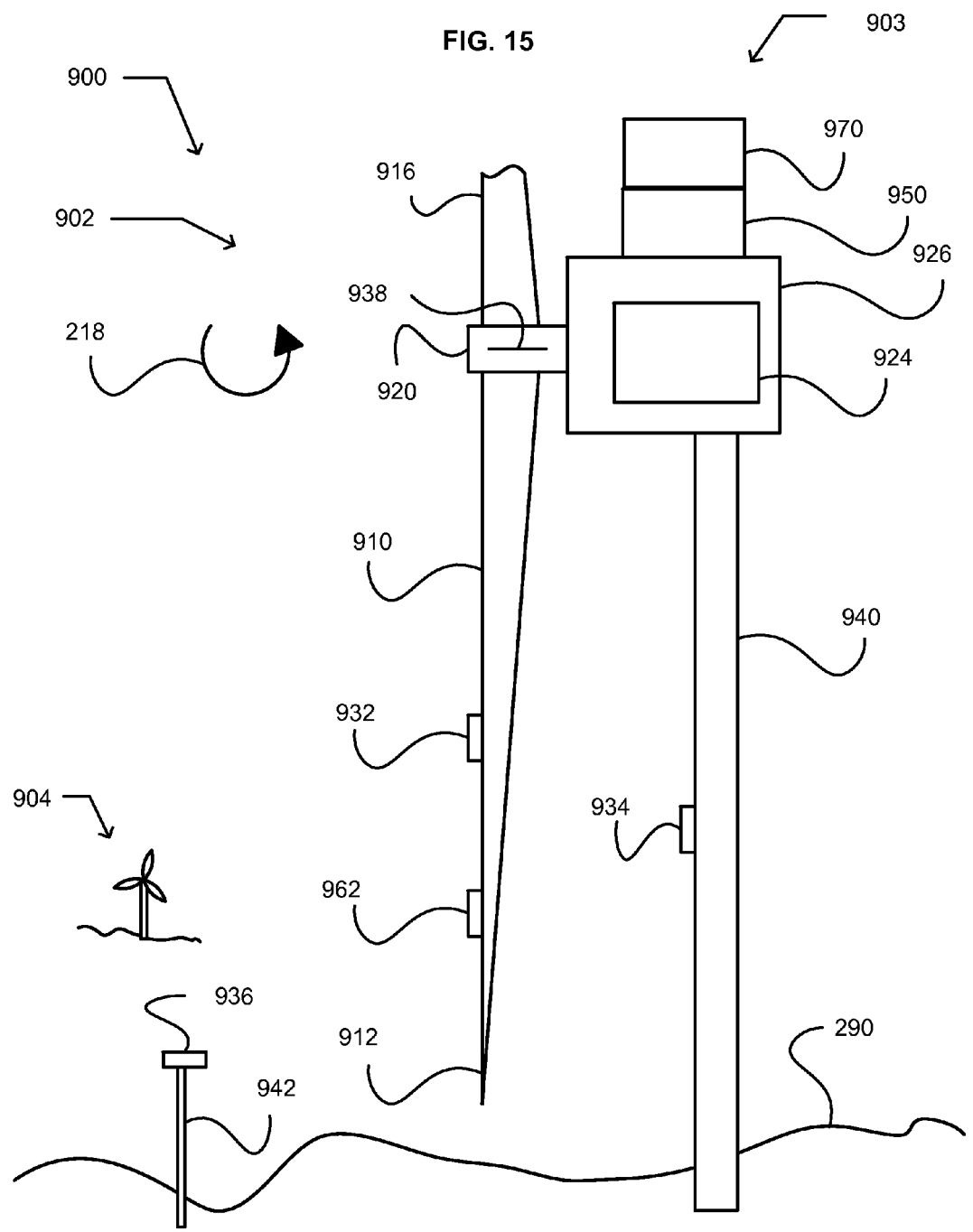
FIG. 15 illustrates an example environment 900.

FIG. 15 illustrates an example environment 900. The illustrated environment includes a wind turbine system 902.

The environment may include other wind turbine systems, illustrated by a wind turbine system 904.

The wind turbine system 902 includes a wind turbine 903 having a rotor blade 910 attached to a rotor hub 920 drivingly coupled to an electric generator 924 and an optional second rotor blade 916. For example, the electric generator may be housed in a nacelle 926. The rotor blade includes a tip 912. The rotor blade has a controllable feature 962 configured if activated to decrease a noise generated by the rotor blade. If activated, the controllable feature has a negative or adverse consequence on lift generated by the rotor blade or it increases drag generated by the rotor blade, which correspondingly results in a decrease in electric power generated by the electric generator. FIG. 15 illustrates an embodiment with the rotor blade 910 rotating counter-clockwise when viewed from a head-on or upwind direction.

The wind turbine system 902 includes a sensor configured to detect a parameter indicative of present or possible future noise generation state of the rotor blade 910. For example, the parameter may include a distinguishing feature of a present or a possible future noise generation state of the rotor blade. For example, a parameter indicative of a present noise generation state may include turbulence forming over a portion of the rotor blade. In an embodiment, the sensor is illustrated by a sensor 932 carried by the rotor blade 910. In an embodiment, the sensor is illustrated by a sensor 934 carried by a support structure 940. In an embodiment, the sensor is illustrated by a sensor 936 carried by a structure 942 other than the support structure 940. In an embodiment, the sensor is illustrated by a sensor and rotational position index mark 938 carried on the rotor hub 920.

The wind turbine system 902 includes a noise manager circuit 950 configured to select a noise mitigation measure responsive to the detected parameter and in compliance with a minimum electric power generation requirement assigned to the wind turbine system. While the noise manager circuit is illustrated in FIG. 15 as carried by the nacelle 926, the noise manager circuit may be carried, located, or positioned at any convenient location. For example, the noise manager circuit may be carried or mounted within the nacelle, onboard some other portion of the wind turbine, on the support structure 940, or off-board of the wind turbine 903. The wind turbine system includes a control circuit 970 configured to activate the controllable feature in response to the selected noise mitigation measure. While the control circuit is illustrated in FIG. 15 as carried by the nacelle 926, the control circuit may be carried, located, or positioned at any convenient location. For example, the control circuit may be carried or mounted within the nacelle, onboard some other portion of the wind turbine, on the support structure, or off-board of the wind turbine.

In an embodiment, the controllable feature includes an airflow-modifiable region of the rotor blade located at a portion of a longitudinal length of the rotor blade. In an embodiment, the controllable feature includes a controllable rotor blade pitch. In an embodiment, the sensor is configured to detect a vortex induced noise. In an embodiment, the sensor includes a microphone. In an embodiment, the sensor includes a pressure sensor. In an embodiment, the sensor includes a vibration or an accelerometer sensor.

In an embodiment, the parameter includes a parameter indicative of noise generated by airflow across the rotor blade 910. In an embodiment, the parameter includes a parameter indicative of an atmospheric variation approaching the rotor blade. In an embodiment, the parameter includes a parameter indicative of noise received by a noise-alleviation zone. In an embodiment, the noise-alleviation zone includes a land area having a noise tolerance rating. For example, a noise tolerance rating may be at least partially based on the existing land use in the area, history of adverse noise incidents, time of day, special events, or prevailing wind direction. In an embodiment, the parameter includes a parameter indicative of a noise produced or propagated by airflow across the rotor blade. For example, the parameter may be indicative of noise generated by airflow across the rotor blade, including vortexes, vibration, and the like. In an embodiment, the parameter includes a parameter indicative of a noise produced or propagated by unstalled airflow across the rotor blade. In an embodiment, the parameter includes turbulence induced noise.

In an embodiment, the minimum electric power generation requirement is responsive to a time of day. In an embodiment, the minimum electric power generation requirement is responsive to a weather condition. For example, the weather condition may include a current or a predicted weather condition. In an embodiment, the minimum electric power generation requirement is responsive to a wind direction. For example, the wind direction may include a current or a predicted wind direction. In an embodiment, the minimum electric power generation requirement is responsive to a target cumulative electric power generation requirement over a period of time. For example, a target cumulative electric power generation requirement may include a certain number of megawatts generated over 12 hours for example, i.e. if target is reached, then authorized to cut electric power generation, even to zero; if target is not reached, system can cut electric power generation but only down to amount predicted to reach target cumulative electric power generation requirement. In an embodiment, the minimum electric power generation requirement includes a maximum allowable percentage reduction in present electric power generation. For example, if present or target electric power generation is 2 MW for the wind turbine system 903, the selected noise mitigation measure cannot reduce the power generation by more than 10% or 200 KW. In an embodiment, the minimum electric power generation requirement is responsive to minimum a monetary value of electric power generation over a period of time. For example, the wind turbine must have generated a minimum dollar value worth of electric power in the last 24 hours before electric power generation can be reduced or ceased. For example, the dollar value may be computed according to a generally prevailing price of electricity, or according to spot price of electricity. In an embodiment, the minimum electric power generation requirement is responsive to a noise sensitivity of a noise-alleviation zone lying potentially downwind of the wind turbine.

In an embodiment, the noise mitigation measure is selected in response to instantaneous values of the detected parameter. In an embodiment, the noise mitigation measure is selected in response to an average value of the detected parameter over a period of time. In an embodiment, the noise mitigation measure is selected in response to cumulative values of the detected parameter and of cumulative power generation over a period of time. In an embodiment, the noise mitigation measure is selected in response to weighted values of the detected parameter and electric power generation over a period of time. For example, electric power generation may be more important at some times of a day than other times.

In an embodiment, the noise mitigation measure includes changing an orientation of a portion of the rotor blade 910. In an embodiment, the noise mitigation measure includes dynamically shaping airflow over at least a portion of the rotor blade 910. In an embodiment, the noise mitigation measure includes releasing air from a region on the rotor blade. In an embodiment, the noise mitigation measure includes creating a transpiration airflow on at least a portion of the rotor blade.

Another embodiment includes a system comprising a first wind turbine and a second wind turbine. The first wind turbine includes a first rotor blade having a first controllable feature and attached to a first rotor hub drivingly coupled to a first electric generator. The first controllable feature is configured if activated to decrease a first noise generated by the first rotor blade and correspondingly to decrease a first electric power generated by the first electric generator. For example, the first wind turbine may be illustrated by the wind turbine described in conjunction with FIG. 15. The second wind turbine includes a second rotor blade having a second controllable feature and attached to a second rotor hub drivingly coupled to a second electric generator. The second controllable feature is configured if activated to decrease a second noise generated by the second rotor blade and correspondingly to decrease a second electric power generated by the second electric generator. For example, the second wind turbine may also be illustrated by the wind turbine described in conjunction with FIG. 15.

The system includes a sensor configured to detect a parameter indicative of present or possible future noise generation state of the first rotor blade or of the second rotor blade. For example, the sensor may include one of more of the embodiments of the sensor described in conjunction with FIG. 15.

The system includes a noise manager circuit configured to select a noise mitigation measure. The noise mitigation measure is selected (i) in response to the detected parameter and (ii) in compliance with the first minimum electric power generation requirement assigned to the first electric generator or the second minimum power generation requirement assigned to the second electric generator. For example, the noise manager circuit may include one of more of the embodiments of the noise manager circuit 950 described in conjunction with FIG. 15.

The system includes a control system configured to activate the first controllable feature or second controllable feature in response to the selected noise mitigation measure. For example, the control system may include one of more of the embodiments of the control system 970 described in conjunction with FIG. 15

FIG. 16 illustrates an example operational flow 1000. After a start operation, the operational flow includes a sensing operation 1010. The sensing operation includes detecting a parameter indicative of present or possible future noise generation state of a rotating rotor blade having a controllable feature and attached to a rotor hub driving an electric generator. The controllable feature is configured to decrease a noise generated by the rotating rotor blade if activated. In an embodiment, the sensing operation may be implemented using an embodiment of the sensor described in conjunction with FIG. 15. A choosing operation 1020 includes selecting a noise mitigation measure responsive to the detected parameter and in compliance with a minimum electric power generation requirement assigned to the electric generator. In an embodiment, the choosing operation may be implemented using the noise manager circuit 950 described in conjunction with FIG. 15. An execution operation 1030 includes activating the controllable feature of the rotating rotor blade in response to the selected noise mitigation measure. In an embodiment, the execution operation may be implemented using the control circuit 970 described in conjunction with FIG. 15. The operational flow includes an end operation.

FIG. 17 illustrates an example operational flow 1100. After a start operation, the operational flow includes a sensing operation 1110. The sensing operation includes detecting a parameter indicative of present or possible future noise generation state of each rotating rotor blade of at least two rotating rotor blades. Each rotating rotor blade respectively having a controllable feature and is attached to a respective rotor hub driving a respective electric generator. Each controllable feature is configured to decrease a noise generated by its respective rotating rotor blade if activated. In an embodiment, the sensing operation may be implemented using an embodiment of the sensor described in conjunction with FIG. 15. A choosing operation 1120 includes selecting a noise mitigation measure (i) responsive to the detected parameter and (ii) in compliance with a minimum electric power generation requirement assigned to each electric generator of the respective electric generators. In an embodiment, the choosing operation may be implemented using the noise manager circuit 950 described in conjunction with FIG. 15. An execution operation 1130 includes activating a controllable feature of a rotating rotor blade of the at least two rotating rotor blades as appropriate to implement the selected noise mitigation measure. In an embodiment, the execution operation may be implemented using the control circuit 970 described in conjunction with FIG. 15. The operational flow includes an end operation.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to, systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims, the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
    a wind turbine including a rotor blade having a controllable feature and attached to a rotor hub drivingly coupled to an electric generator, the controllable feature configured if activated to decrease a noise generated by the rotor blade and correspondingly to decrease electric power generated by the electric generator;
    a sensor configured to detect a parameter indicative of a present or possible future noise generation state of the rotor blade;
    a noise manager circuit configured to select a noise mitigation measure responsive to the detected parameter and in compliance with a minimum electric power generation requirement assigned to the wind turbine; and
    a control circuit configured to activate the controllable feature in response to the selected noise mitigation measure.

2. The system of claim 1, wherein the controllable feature includes an airflow-modifiable region of the rotor blade located at a portion of a longitudinal length of the rotor blade.

3. The system of claim 1, wherein the controllable feature includes a controllable rotor blade pitch.

4. The system of claim 1, wherein the sensor is configured to detect a vortex induced noise.

5. The system of claim 1, wherein the sensor includes a microphone.

6. The system of claim 1, wherein the sensor includes a pressure sensor.

7. The system of claim 1, wherein the sensor includes a vibration or an accelerometer sensor.

8. The system of claim 1, wherein the parameter includes a parameter indicative of noise generated by airflow across the rotor blade.

9. The system of claim 1, wherein the parameter includes a parameter indicative of an atmospheric variation approaching the rotor blade.

10. The system of claim 1, wherein the parameter includes a parameter indicative of noise received by a noise-alleviation zone.

11. The system of claim 10, wherein the noise-alleviation zone includes a land area having a noise tolerance rating.

12. The system of claim 1, wherein the parameter includes a parameter indicative of a noise produced or propagated by airflow across the rotor blade.

13. The system of claim 1, wherein the parameter includes a parameter indicative of a noise produced or propagated by unstalled airflow across the rotor blade.

14. The system of claim 1, wherein the parameter includes turbulence induced noise.

15. The system of claim 1, wherein the minimum electric power generation requirement is responsive to a time of day.

16. The system of claim 1, wherein the minimum electric power generation requirement is responsive to a weather condition.

17. The system of claim 1, wherein the minimum electric power generation requirement is responsive to a wind direction.

18. The system of claim 1, wherein the minimum electric power generation requirement is responsive to a target cumulative electric power generation requirement over a period of time.

19. The system of claim 1, wherein the minimum electric power generation requirement includes a maximum allowable percentage reduction in present electric power generation.

20. The system of claim 1, wherein the minimum electric power generation requirement is responsive to a minimum monetary value of electric power generation over a period of time.

21. The system of claim 1, wherein the minimum electric power generation requirement is responsive to a noise sensitivity of a noise-alleviation zone lying potentially downwind of the wind turbine.

22. The system of claim 1, wherein the noise mitigation measure is selected in response to instantaneous values of the detected parameter.

23. The system of claim 1, wherein the noise mitigation measure is selected in response to an average value of the detected parameter over a period of time.

24. The system of claim 1, wherein the noise mitigation measure is selected in response to cumulative values of the detected parameter and electric power generation over a period of time.

25. The system of claim 1, wherein the noise mitigation measure is selected in response to weighted values of the detected parameter and electric power generation over a period of time.

26. The system of claim 1, wherein the noise mitigation measure includes changing an orientation of a portion of the rotor blade.

27. The wind turbine system of claim 1, wherein the noise mitigation measure includes dynamically shaping airflow over at least a portion of the rotor blade.

28. The wind turbine system of claim 1, wherein the noise mitigation measure includes releasing air from a region on the rotor blade.

29. The wind turbine system of claim 1, wherein the noise mitigation measure includes creating a transpiration airflow on at least a portion of the rotor blade.

30. A system comprising:
a wind turbine including a rotor blade having a controllable feature and attached to a rotor hub drivingly coupled to an electric generator, the controllable feature configured if activated to decrease a noise generated by the rotor blade and correspondingly to decrease electric power generated by the electric generator;
a sensor configured to detect a parameter indicative of a present or possible future noise generation state of the rotor blade; and
a controller circuit configured to select a noise mitigation measure responsive to the detected parameter and in compliance with a minimum electric power generation requirement assigned to the wind turbine, and to activate the controllable feature in response to the selected noise mitigation measure.

31. A system comprising:
a first wind turbine including a first rotor blade having a first controllable feature and attached to a first rotor hub drivingly coupled to a first electric generator, the first controllable feature configured if activated to decrease a first noise generated by the first rotor blade and correspondingly to decrease a first electric power generated by the first electric generator;
a second wind turbine including a second rotor blade having a second controllable feature and attached to a second rotor hub drivingly coupled to a second electric generator, the second controllable feature configured if activated to decrease a second noise generated by the second rotor blade and correspondingly to decrease a second electric power generated by the second electric generator;
a sensor configured to detect a parameter indicative of a present or possible future noise generation state of the first rotor blade or of the second rotor blade;
a noise manager circuit configured to select a noise mitigation measure (i) responsive to the detected parameter and (ii) in compliance with a first minimum electric power generation requirement assigned to the first electric generator and a second minimum power generation requirement assigned to the second electric generator; and
a control system configured to activate the first controllable feature or second controllable feature as appropriate to implement the selected noise mitigation measure.

32. A method comprising:
detecting a parameter indicative of a present or possible future noise generation state of a rotating rotor blade having a controllable feature and attached to a rotor hub driving an electric generator, the controllable feature configured to decrease a noise generated by the rotating rotor blade if activated;
selecting a noise mitigation measure responsive to the detected parameter and in compliance with a minimum electric power generation requirement assigned to the electric generator; and
activating the controllable feature of the rotating rotor blade in response to the selected noise mitigation measure.

33. A method comprising:
detecting a parameter indicative of a present or possible future noise generation state of each rotating rotor blade of at least two rotating rotor blades, each rotating rotor blade respectively having a controllable feature and attached to a respective rotor hub driving a respective electric generator, each controllable feature configured to decrease a noise generated by its respective rotating rotor blade if activated;
selecting a noise mitigation measure responsive to the detected parameter and in compliance with a minimum electric power generation requirement assigned to each electric generator of the respective electric generators; and
activating a controllable feature of a rotating rotor blade of the at least two rotating rotor blades as appropriate to implement the selected noise mitigation measure.

* * * * *